US011071172B2

(12) United States Patent
He et al.

(10) Patent No.: US 11,071,172 B2
(45) Date of Patent: Jul. 20, 2021

(54) BANDWIDTH ADAPTATION FOR WIRELESS COMMUNICATION SYSTEM

(71) Applicant: APPLE INC., Cupertino, CA (US)

(72) Inventors: Hong He, Sunnyvale, CA (US); Gang Xiong, Portland, OR (US); Hwan-Joon Kwon, Portland, OR (US); Alexei Davydov, Nizhny Novgorod (RU); Dae Won Lee, Portland, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/349,251

(22) PCT Filed: Dec. 29, 2017

(86) PCT No.: PCT/US2017/069070
§ 371 (c)(1),
(2) Date: May 10, 2019

(87) PCT Pub. No.: WO2018/128938
PCT Pub. Date: Jul. 12, 2018

(65) Prior Publication Data
US 2019/0289668 A1  Sep. 19, 2019

Related U.S. Application Data

(60) Provisional application No. 62/444,198, filed on Jan. 9, 2017.

(51) Int. Cl.
*H04W 72/04* (2009.01)
*H04L 5/00* (2006.01)
(Continued)

(52) U.S. Cl.
CPC ........... *H04W 88/06* (2013.01); *H04L 1/1614* (2013.01); *H04L 5/0044* (2013.01);
(Continued)

(58) Field of Classification Search
CPC ..... H04L 5/001; H04L 5/0053; H04L 5/0035; H04L 5/0048; H04L 5/0094;
(Continued)

(56) References Cited

U.S. PATENT DOCUMENTS

2012/0014330 A1   1/2012  Damnjanovic et al.
2012/0076028 A1*  3/2012  Ko ........................ H04B 7/0626
                                                370/252
(Continued)

FOREIGN PATENT DOCUMENTS

WO    2013025547 A2    2/2013

OTHER PUBLICATIONS

3GPP TSG RAN WG1 Mtg #87; R1-1612119; Title: On UE-specific Bandwidth Adaptation for Single Carrier Operation Document for: Discussion; Agenda Item: 7.1.1; Source: MediaTek Inc.; Reno, USA; Nov. 14-18, 2016.

*Primary Examiner* — Sai Aung

(57) ABSTRACT

Technology for a user equipment (UE) configured for bandwidth adaptation (BWA) is disclosed. The UE can decode resource allocation information for a first radio frequency (RF) bandwidth including a primary subband available to the UE for data communication. Th 5 e UE can decode resource allocation information for a second RF bandwidth, wherein the second RF bandwidth comprises the first RF bandwidth and at least one secondary subband available to the UE for data communication. The UE can encode data for transmission to a next generation NodeB (gNB) using resources allocated for the second RF bandwidth in the primary subband and the secondary subband. The UE 10 can have a memory interface configured to send to a memory the resource allocation information for the first RF bandwidth and the second RF bandwidth.

20 Claims, 18 Drawing Sheets

(51) Int. Cl.
*H04W 88/06* (2009.01)
*H04L 1/16* (2006.01)
*H04L 27/26* (2006.01)
*H04W 80/02* (2009.01)
*H04W 80/08* (2009.01)
*H04W 52/02* (2009.01)

(52) U.S. Cl.
CPC .......... *H04L 5/0064* (2013.01); *H04L 5/0092* (2013.01); *H04L 5/0098* (2013.01); *H04L 27/2607* (2013.01); *H04W 52/0251* (2013.01); *H04W 52/0261* (2013.01); *H04W 72/042* (2013.01); *H04W 72/0453* (2013.01); *H04W 80/02* (2013.01); *H04W 80/08* (2013.01); *Y02D 30/70* (2020.08)

(58) Field of Classification Search
CPC ... H04L 5/0057; H04L 1/0026; H04L 5/0007; H04L 5/0023; H04L 5/005; H04L 5/0055; H04L 12/189; H04L 1/0027; H04L 5/0091; H04L 5/0044; H04L 12/18; H04L 27/2602; H04W 72/042; H04W 72/12; H04W 72/0413; H04W 72/0446; H04W 24/10; H04W 4/06; H04W 16/14; H04W 28/18; H04W 74/0808; H04W 72/005; H04W 72/04; H04W 4/025; H04W 72/046; H04W 72/1284; H04W 74/006; H04W 76/15
See application file for complete search history.

(56) References Cited

U.S. PATENT DOCUMENTS

| | | | |
|---|---|---|---|
| 2014/0177584 A1* | 6/2014 | Ouchi | H04W 52/242 370/329 |
| 2015/0208392 A1* | 7/2015 | Park | H04B 7/024 370/329 |
| 2016/0234860 A1* | 8/2016 | Shimezawa | H04L 1/1854 |
| 2016/0248553 A1* | 8/2016 | Shimezawa | H04L 1/1861 |
| 2018/0006791 A1* | 1/2018 | Marinier | H04L 1/0057 |
| 2018/0014283 A1* | 1/2018 | You | H04W 48/12 |
| 2018/0110057 A1* | 4/2018 | Park | H04B 7/0404 |

* cited by examiner

BANDWIDTH ADAPTATION FOR WIRELESS COMMUNICATION SYSTEM

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
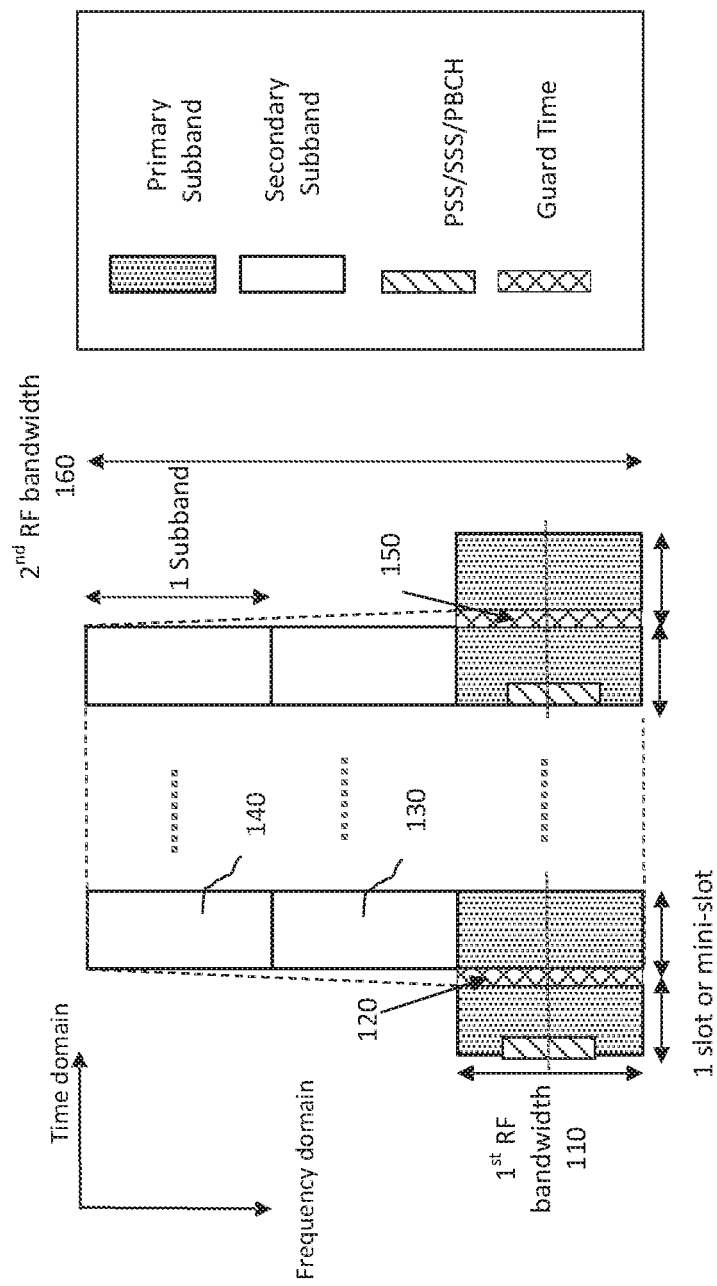
FIG. 1 illustrates an example of a bandwidth adaptation operation, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). In 3GPP fifth generation (5G) LTE communication systems, the node is commonly referred to as a new radio (NR) or next generation Node B (gNodeB or gNB). The downlink (DL) transmission can be a communication from the node (e.g., eNodeB or gNodeB) to the wireless device (e.g., UE), and the uplink (UL) transmission can be a communication from the wireless device to the node.

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

The present technology describes a fifth generation (5G) system that utilizes new radio (NR) designs in order to provide for a more power efficient system for downlink designs and battery-use operations. In general, the use of batteries, and the power efficiency therein has been studied at a user equipment (UE) and is highly desirable to design 5G NR systems in a power-efficient manner. The NR system can support operation in a very wide range of spectrum, ranging from sub-GHz up to at least several tens of GHz, with very different possibilities regarding the available spectrum and, thus, possible transmission bandwidths. The NR can support a very wide range of applications and use cases. Some of these use cases will use very wide UE transmissions and reception bandwidth. Other applications will use very low UE complexity implying a need to operate with a much lower UE reception and/or transmission bandwidth. It can be observed that 60% of power consumption can come from wide-band physical downlink control channel (PDCCH) decoding, synchronization tracking, and low-data-rate services in the current LTE design. Clearly, applying a similar mechanism for NR over considerably larger bandwidth would result in significantly increased UE power consumption. Accordingly, this has stimulated a motivation to design a new approach to adapt the UEs RF bandwidth in accordance to the instant traffic load to minimize the power consumption of NR devices.

Accordingly, it has been determined that, at least for single carrier operation, NR can be configured to allow a UE to operate in a way in which the UE receives at least downlink control information in a first RF bandwidth and where the UE is not expected to receive data or data control information (DCI) in a second RF bandwidth that is larger than the first RF bandwidth within less than X microseconds (µs). In one embodiment, the first RF bandwidth can also be within the second bandwidth, wherein the first RF bandwidth can be at the center of the second bandwidth. Additionally, the maximal ratio of the first RF bandwidth can be greater than the second RF bandwidth, wherein the RF bandwidth for the first or the second can utilize an RF bandwidth adaptation for radio resource monitoring (RRM) measurement.

However, the detailed signaling design to enable the bandwidth adaptation (BWA) is still open. In accordance with the issues that are still open, the issues regarding impacts on resource allocation can be carefully considered and addressed to avoid the negative impacts on UE power consumption. An embodiment of the present technology provides subbands-based methods to efficiently enable a BWA operation with minimized control overhead while still meeting the required BWA operation flexibility. In addition, the resource allocation issue can also be addressed without increasing blind decoding attempts at UE side.

The proposed disclosure further provides for a high level concept proposing to efficiently operate RF bandwidth adaptation (BWA) based on traffic characteristics. Accordingly, there can be a subband based BWA operation to tradeoff between BWA flexibility and signaling overhead. Accordingly, the concept of Type-1 and Type-2 subbands are defined to minimize signaling overhead and to also achieve load distribution. There can also be a subband reselection procedure to allow a next generation Node B or base station to achieve load balancing. Additionally, a variety of signaling designs, covering a media access control (MAC) control element (CE) and a number of layer one (L1) designs, to trigger a BWA operation as well are indicated with the RF bandwidth and location for extension. Also, detailed resource allocation schemes to utilize the scalable RF bandwidth are disclosed, taking into account the potential impacts on the UE blind decoding attempt increase.

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

FIG. 1 illustrates an example of a bandwidth adaptation operation. Certain aspects of the present technology provides methods for wireless communication by a user equipment (hereinafter "UE") to determine the Radio Frequency (RF) bandwidth for data transmission or reception operations. In particular, the UE is scheduled to transmit or receive allocation of, at least a portion of a first RF bandwidth 110 or at least a portion of a second RF bandwidth 140 in different slots or mini-slots.

In various embodiments, the location of guard time 120 and 150 can either be provided for in the last or first $N_{symb}$ symbols of one mini-slot or slot. The value of $N_{symb}$ can be semi-statically configured for a UE through an RRC message or dynamically signaled by PDCCH that triggers the BWA operation at least based on the corresponding capability reported by a UE. Also, the 1st RF bandwidth 110 can be within the $2^{nd}$ larger RF bandwidth 130 or 140 or out of the $2^{nd}$ RF bandwidth 160.

Figure 2:
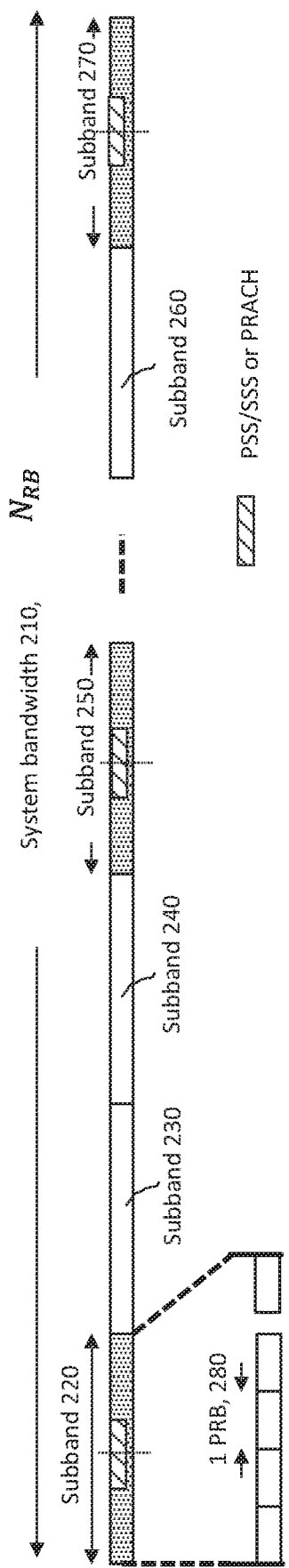
FIG. 2 illustrates a subband structure for bandwidth adaptation (BWA), in accordance with an example.
Figure 3A:
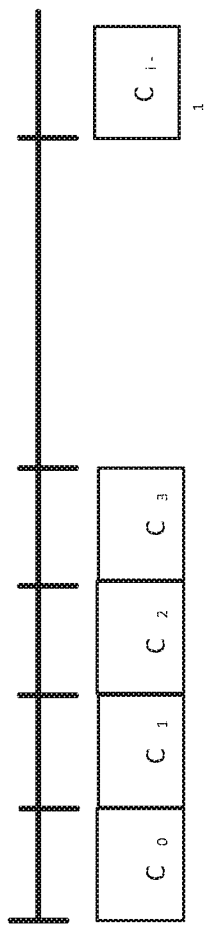
FIG. 3(a) illustrates examples of BWA medium access control (MAC) control element (CE) formats, in accordance with an example.
Figure 3B:
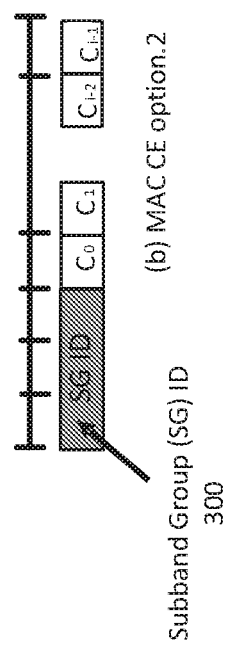
FIG. 3(b) illustrates examples of a subband group based BWA operation, in accordance with an example.
Figure 3B:
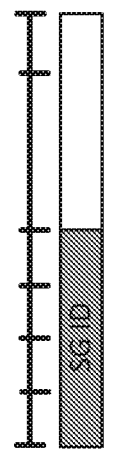
Figure 3C:
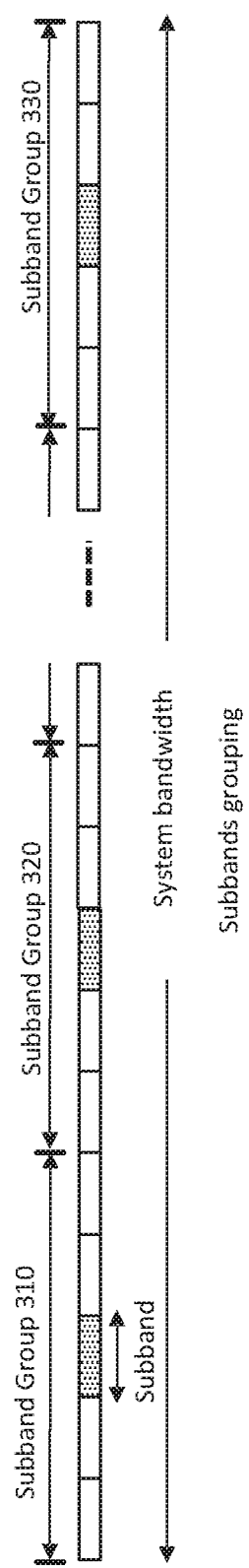
FIG. 3(c) illustrates examples of subbands that are further divided into a number of subband groups (SGs), in accordance with an example.

FIG. 2 illustrates a subband structure for bandwidth adaptation (BWA). Additionally, FIG. 2 provides for the ability to limit the signaling overhead of RF bandwidth adaption (BWA) operation. A set of subbands 220-270 spans the entire system bandwidth 210. A subband is a unit of RF BWA operation in frequency to each UE. In one embodiment, a subband is a set of k contiguous PRBs 280 where k is a function of system bandwidth. Alternatively, k can be signaled as part of the system information or in an RRC configuration message, or dynamically indicated using a Downlink Control Information (DCI) format. Note that the last subband can have fewer than k contiguous PRBs depending on system bandwidth $N_{RB}$. The number of subbands for system bandwidth given by $N_{RB}$ is defined by $N=[N_{RB}/k]$. In one embodiment, the subbands can be indexed in the order of increasing frequency and non-inceasing sizes starting at the lowest frequency.

In some designs, the synchronization signals, including a primary synchronization signal (PSS) and a secondary synchronization signal (SSS), can be only transmitted on a subset of subbands, termed as Type-1 subbands. For example, subbands 220, 250 and 270 illustrated in FIG. 2 can be Type-1 subbands. The Type-1 subbands can be used by the UE for cell search and acquisition. In addition, the gNodeB (gNB) can also transmit the Physical Broadcast Channel (PBCH) carrying some system information in these Type-1 subbands, where the primary synchronization signal (PSS) and secondary synchronization signal (SSS) are transmitted. In one embodiment, a subband without PSS/SSS/PBCH transmission i.e. subband 230, 240 and 260 in FIG. 2, is termed as Type-2 subband, which is not accessible by the UE during cell search and is not standalone.

In one embodiment the system can perform BWA operation for a Type-1 subband on the downlink or uplink. For BWA, a Type-1 subband (e.g. $1^{st}$ bandwidth 110 in FIG. 1) can be associated with one or more Type-2 subbands (e.g. subband 130 and 140), with each covering a range of frequencies and providing additional bandwidth for data transmission. The BWA can be supported by certain UEs and may not be supported by other UEs.

In an embodiment, the UE can be configured with a Type-1 subband as a primary subband (PSB). In addition, a subband reselection procedure can be introduced. In one design, the UE can measure, on a regular basis (i.e. periodically), the reliability of a signal on a respective subband configured by a gNB. The signal reliability can be measured, for example, in terms of Reference Signal Received Power (RSRP) or Reference Signal Received Quality (RSRQ) or Received Signal Strength Indicator (RSSI). Based on the reliability of the PSB, the UE can request a PSB reselection to the gNB. In the PSB reselection, a single Type-1 subband can be chosen as PSB for a given UE, which carries control signals, including PDCCH for data communications, and PSS/SSS or PBCH to maintain the RRC connection between gNB and UE. In addition, the PSB reselection can be initiated for load distribution purpose. Typically, one gNB is in communication with multiple UEs and different PSBs can be selected for different UEs to distribute the load.

FIG. 3(*a*) illustrates examples of a BWA medium access control (MAC) control element (CE) formats. The BWA operation can be triggered by MAC Control element (CEs) for NR. In one design, a new MAC CE can be defined, which is identified by a MAC PDU subheader with a unique LCID defined in the specification. The MAC CE can have a fixed size. Accordingly, the BWA MAC CE can be defined in one or more of the following options.

In one option, the subband-based MAC CE format, is illustrated in FIG. 3(*a*). The element $C_i$ is defined if there is a subband configured with subbandIndex i by RRC signaling, wherein i is a positive integer. The field indicates whether the subband with subbandIndex i should be covered by the $2^{nd}$ bandwidth. In particular, in one example, the $C_i$ field can be set to "1" to indicate that the $2^{nd}$ RF bandwidth shall include the subband with subbandIndex i; and not cover this said subband otherwise, or vice versa.

FIG. 3(*b*) illustrates examples of a subband group based BWA operation. In one option, illustrated in FIG. 3(*b*), an example of a subband group based BWA operation is disclosed.

FIG. 3(*c*) further illustrates configurations of subbands within a BWA operation. Addtionally, the subbands can be further divided into a number of subband groups (SGs), 310-330 (FIG. 3*c*), and each SG can contain at least one Type-1 subband. Each SG can be configured with a SG identification (SGID) to facilitate the BWA operation. In one embodiment, the SGID is explicitly encoded in the MAC CE to identify one from multiple SGs for BWA operation. Then, the $C_i$ field can be used to indicate the subband configured with subbandIndex i within the indicated SG with SGID 300 to be included in the $2^{nd}$ RF Bandwidth, or not included. Alternatively, the SG can be implicitly determined. For example, the BWA can be limited to the SG where the PSB is located. With this design, the BWA is limited to one single SG.

In another option, a subband indication value (SBIV) based consecutive virtual subband extension is disclosed. Accordingly, a subband indication field consists of a subband indication value (SBIV) corresponding to a starting subband (e.g. the UE-specific PSB) and a length in terms of virtually contiguously subbands. Alternatively, an SBIV is identical to the ending subband index assuming UE-specific PSB implicitly serves as the starting subband index.

Figure 4:
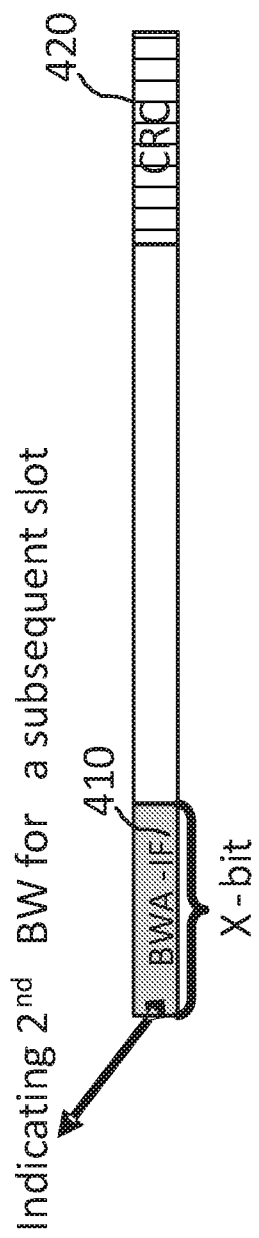
FIG. 4 illustrates an exemplified downlink control information (DCI) format for BWA operation, in accordance with an example.

FIG. 4 illustrates an exemplified downlink control information (DCI) format for BWA operation. According to aspects of the technology, the $2^{nd}$ RF bandwidth can be dynamically indicated by explicit signaling (e.g. DCI format) through an X-bit BWA indictor field (BWA-IF) 410, as illustrated in FIG. 4. The BWA-IF can be mapped on UE-specific search space. Additionally, there can be a cyclic redundancy check (CRC) 420 apart of the configuration. In one example, the BWA-IF field may only be present for UEs enabled with BWA operations. In one design, a bitmap field of X bits can be added to each DCI format and the bitmap length either equals to the number of subbands configured for a given UE or alternatively can be equal to the number of subbands in the SG consisting of a PSB.

Figure 5:
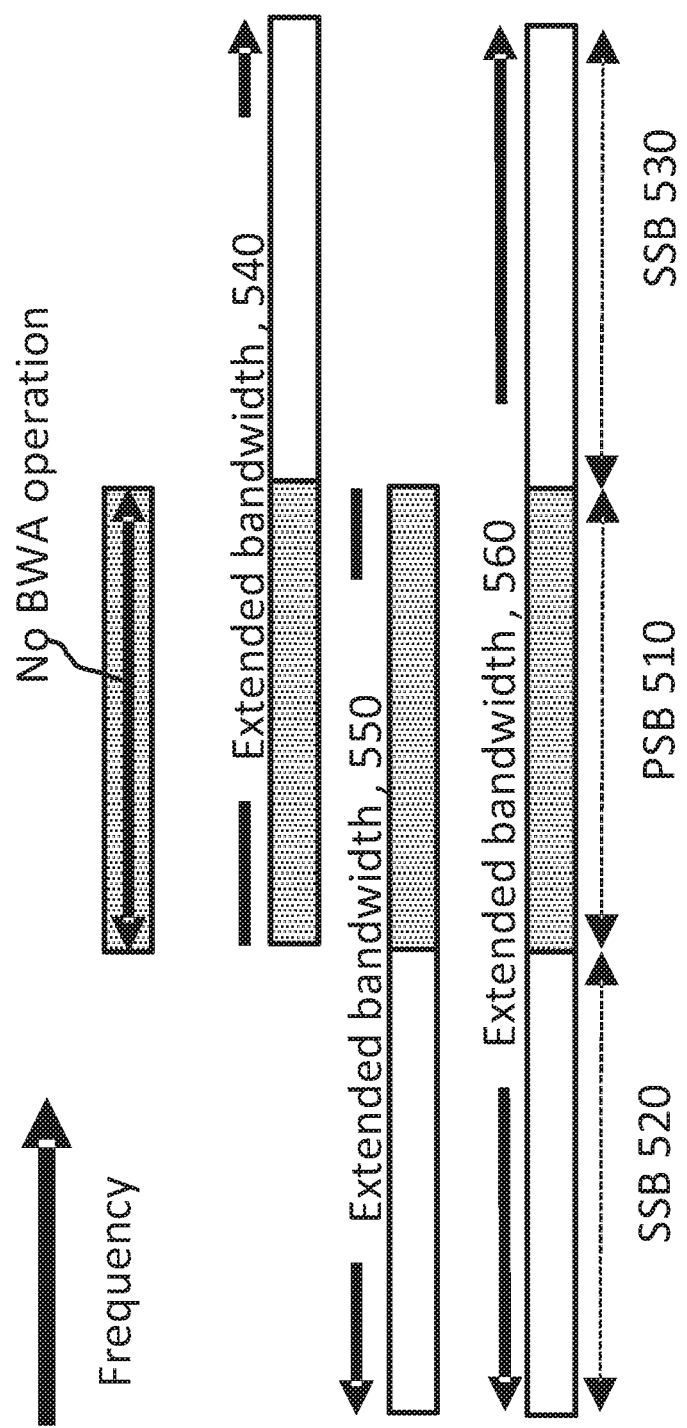
FIG. 5 illustrates a hybrid BWA signaling mechanism for radio frequency (RF) bandwidth, in accordance with an example.

FIG. 5 illustrates a hybrid BWA signaling mechanism for radio frequency (RF) bandwidth. According to one example of a BWA-IF based approach, a number of subband sets are configured by RRC to associate with different values of a BWA-IF field as illustrated in Table 1 and FIG. 5.

TABLE 1

| Value of BWA-IF field | Description |
| --- | --- |
| '00' | No BWA operation |
| '01' | $1^{st}$ set of subbands configured by higher layers |
| '10' | $2^{nd}$ set of subbands configured by higher layers |
| '11' | $3^{rd}$ set of subbands configured by higher layers |

In one embodiment, when the UE is configured with BWA operation, upon decoding a DCI format with a BWA-IF field, the UE can extend its RF bandwidth subject to the detected BWA-IF value. In one embodiment, the UE can receive the value of the BWA-IF field set as "11", then the UE can extend its RF bandwidth to 560, which covers PSB 510, and the secondary subbands (SSB) 520 and SSB 530.

In another embodiment, FIG. 5 can provide signaling examples to form various $2^{nd}$ wide RF bandwidths or extended bandwidths. In one example, the aggregated Type-2 subband 520 can be located at the low end of a Type-1 subband 510 to form an extended bandwidth 550, or located at the high end of a Type-1 subband 510 to form an Extended RF bandwidth 540. Additionally, both type-1 subband 520 and type-2 subband 530 can be included with the PSB 510 in order to form the extended bandwidth 560. In general, the Type-2 subbands can be located anywhere in relation to the aggregated Type-1 subband. The Type-2 subbands can be contiguous or non-contiguous with the Type-1 subband and can be located on one side or both sides of Type-1 subbands. Therefore, in some designs, 1-bit or 2-bit field can be introduced in DCI format to indicate the relative location of the Type-2 subband.

Additionally, according to Table 1, a $b_i$ element can be utilized to indicate the location of the Type-2 subband relative to the Type-1 subband. A bit value of 1 can indicate the left extension, i.e. subband 520, and the right extension, subband 540. Accordingly, a 2 bit field can additionally indicate that both left and right extension are enabled using "11". Also, a "01" can be used to indicate a left extension, and a "10" can be used to indicate a right extension.

Figure 6:
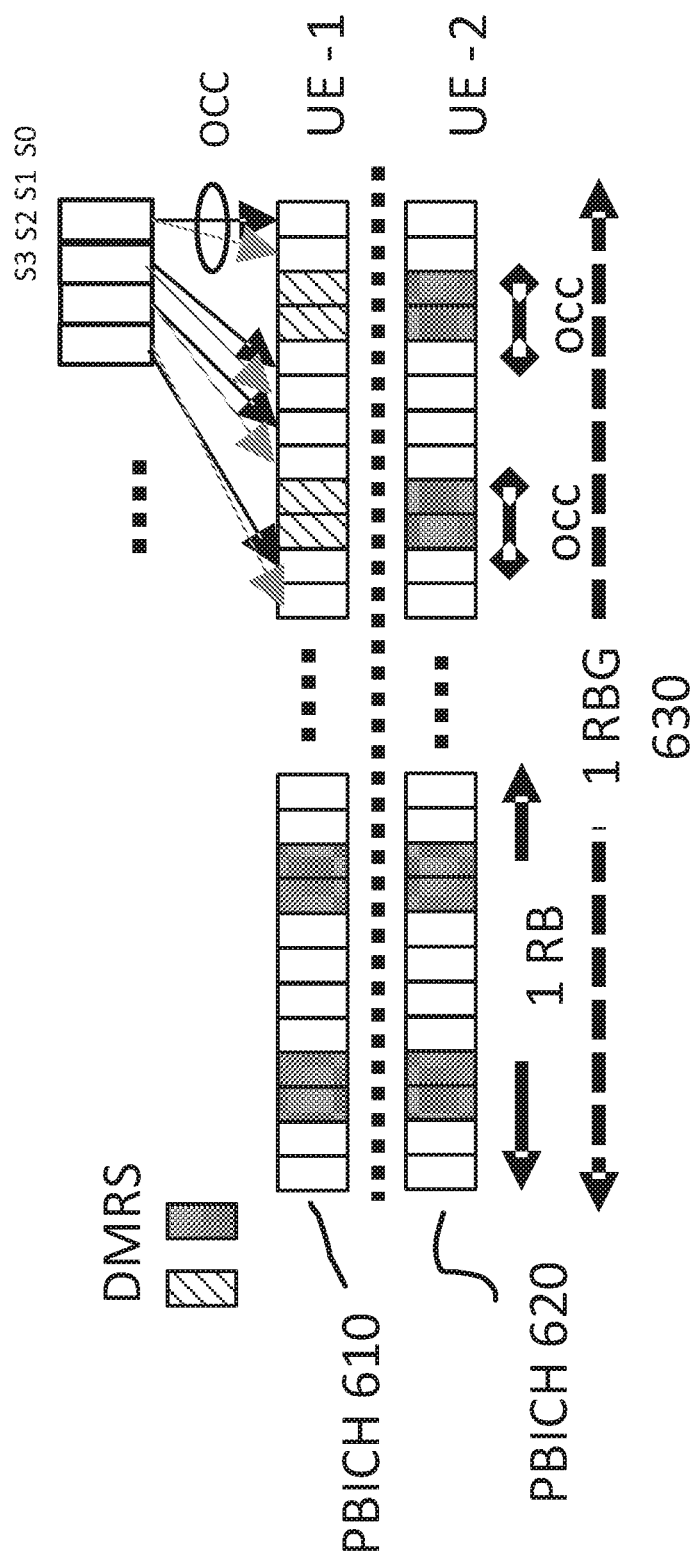
FIG. 6 illustrates a physical bandwidth indicator channel (PBICH) structure used for BWA indicator field (BWA-IF) information bits transmission, in accordance with an example.

FIG. 6 illustrates a physical bandwidth indicator channel (PBICH) structure used for BWA indicator field (BWA-IF) information bits transmission. According to aspects of the discloure, the BWA-IF information bits b(0), . . . , b($M_{bit}$-1) can be carried on a Physical Bandwidth Indicator Channel (PBICH).

In one embodiment, multiple PBICHs mapped to the same sets of resource elements (i.e. PBICH 610 and 620 in FIG. 6) constitute a PBICH group, where PBICHs within the same PBICH group are separated through different orthogonal sequences. A PBICH resource is identified by the index pair ($n_{PBICH}^{group}$, $n_{PBICH}^{seq}$), where $n_{PBICH}^{group}$ is the PBICH group number and $n_{PBICH}^{seq}$ is the orthogonal sequence index within the group.

In some examples, the block of bits transmitted on one PBICH can be modulated using BPSK or QPSK scheme, resulting in a block of complex-valued symbols s(0), . . . , s($M_s$-1), where $M_s = M_{bit}$ for BPSK and $M_s = M_{bit}/2$ for QPSK. The block of modulation symbols s(0), . . . , s($M_s$-1) can be symbol-wise multiplied with an orthogonal sequence, resulting in a sequence of d(0), . . . , d($M_{symb}$-1) according to d(i)=w(i mod $N_{SF}^{PBICH}$)·s([i/$N_{SF}^{PBICH}$]), where i=0, . . . , $M_{symb}$, and $M_{symb} = N_{SF}^{PBICH} \cdot M_s$, where $N_{SF}^{PBICH}$=2.

Additionally, the sequence [w(0) . . . w($N_{SF}^{PBICH}$-1] is given by Table 2 where the sequence index $n_{PBICH}^{seq}$ corresponds to the PBICH number within the PBICH group and the $n_{PBICH}$ is provided by higher layers. The orthogonal cover code OCC sequence for Demodulation Reference Signal (DMRS) can be the same as that used for information symbols. One PBICH channel can be transmitted on a group of RBs i.e. RB group (RBG) 630. The size of RBG is either fixed in a specification or is signaled through system information.

TABLE 2

| Sequence Index $n_{PBICH}^{seq}$ | Orthogonal Sequence, (OCC) |
| --- | --- |
| 0 | [+1, +1] |
| 1 | [+1, −1] |
| 2 | [+j, +j] |
| 3 | [+j, −j] |

Figure 7:
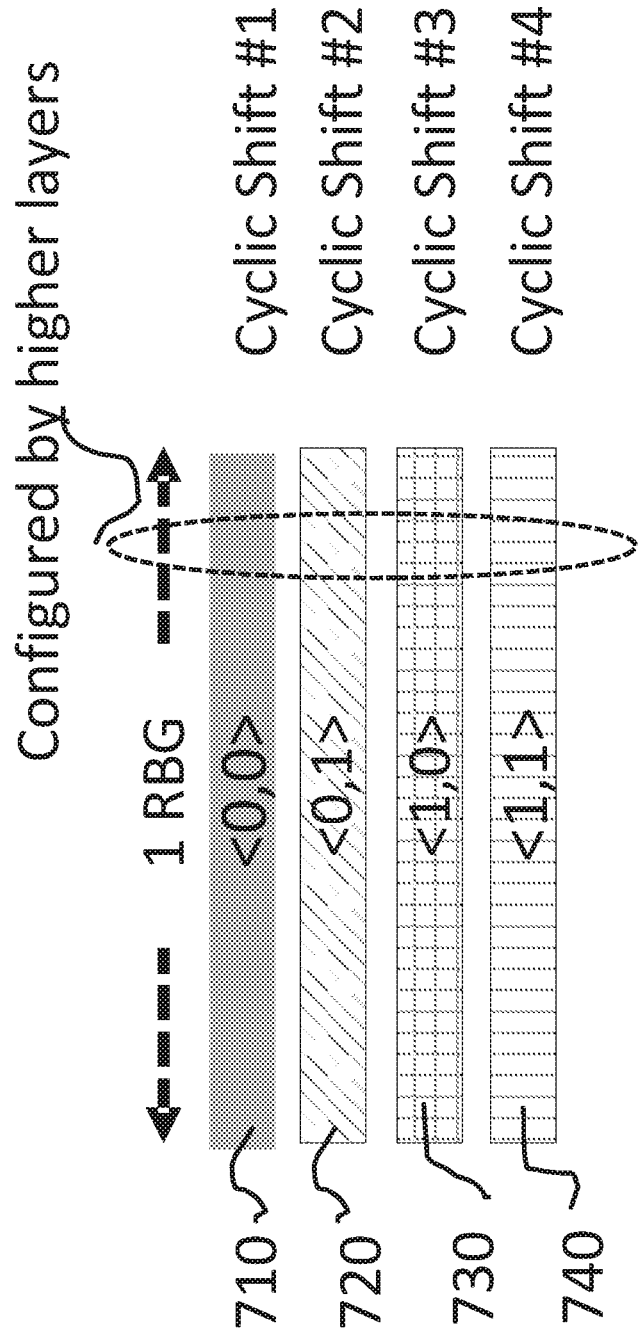
FIG. 7 illustrates a PBICH channel selection for BWA-IF indication, in accordance with an example.

FIG. 7 illustrates a PBICH channel selection for a BWA-IF indication. According to one embodiment of the PBICH approach, a UE is configured with a set of PBICH channels by higher layers and a PBICH channel is identified by a Cyclic Shift (CS) index value. The UE can select one PBICH resource from a set of PBICH resources according to Table 3 based on the value of BWA-IF information bits.

TABLE 3

| The Value of BWA-IF Field | PBICH Resources |
| --- | --- |
| 00 | Cyclic Shift #1 |
| 01 | Cyclic Shift #2 |
| 10 | Cyclic Shift #3 |
| 11 | Cyclic Shift #4 |

As one example, a gNB can assign four PBICH resources for a given UE to convey 2-bits of BWA-IF values. According to Table 3, in correspondence with FIG. 7, the following examples are applicable. A PBICH channel 710 identified by CS #1 can be selected by the gNB to inform a UE to conduct a BWA operation subject to a BWA-IF value of "00". A CS #2 can be selected by the gNB to inform the UE to conduct a BWA operation subject to a BWA-IF value of "01". A CS #3 can be selected by the gNB to inform the UE to conduct a BWA operation subject to a BWA-IF value of "10". A CS #4 can be selected by the gNB to inform the UE to conduct a BWA operation subject to a BWA-IF value of "11".

In another example, the 1-bit BWA-IF information can be carried by the presence of transmission of a PBICH resource from the gNB. The PBICH resource can be configured by higher layers for a UE, e.g. identified by a particular CS value.

Figure 8:
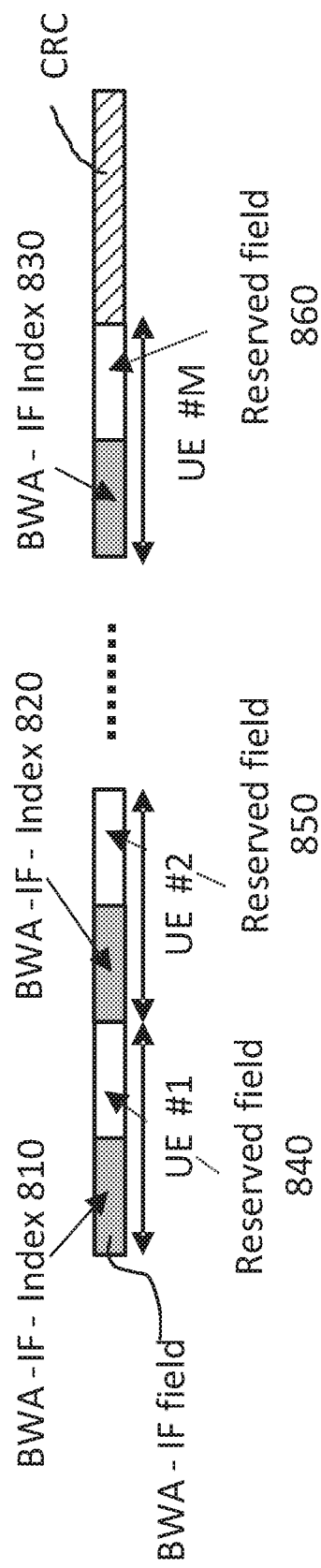
FIG. 8 illustrates an exemplified UEs-group specific DCI format, in accordance with an example.

FIG. 8 illustrates an exemplified UEs-group specific DCI format. Accordingly, one DCI format can be defined for the transmission of BWA-IF commands for multiple UEs to perform BWA operations. In one embodiment, BWA-IF index 810, BWA-IF index 820, . . . , BWA-IF index 830, are provided for in FIG. 8, as one illustration of a configuration exemplifying a UEs-group-specific DCI format for UEs 1 to M, wherein M is a positive integer.

The parameter BWA-IF-Index provided by the higher layers can be used to determine the index of the BWA-IF field for a given UE. As one example, UE #2 can be configured with BWA-IF-Index 820 as "2". Accordingly, the gNB can use the $2^{nd}$ BWA-IF field to trigger the BWA's relevant operations. This can result in the DCI format being mapped onto either a cell-specific search space (CSS) or a UEs-group-specific search space. In one example, the UE-group-specific search space can be identified using a dedicated radio network temporary identifier (RNTI), or other type of identifier that can be provided by higher layers.

Figure 9:
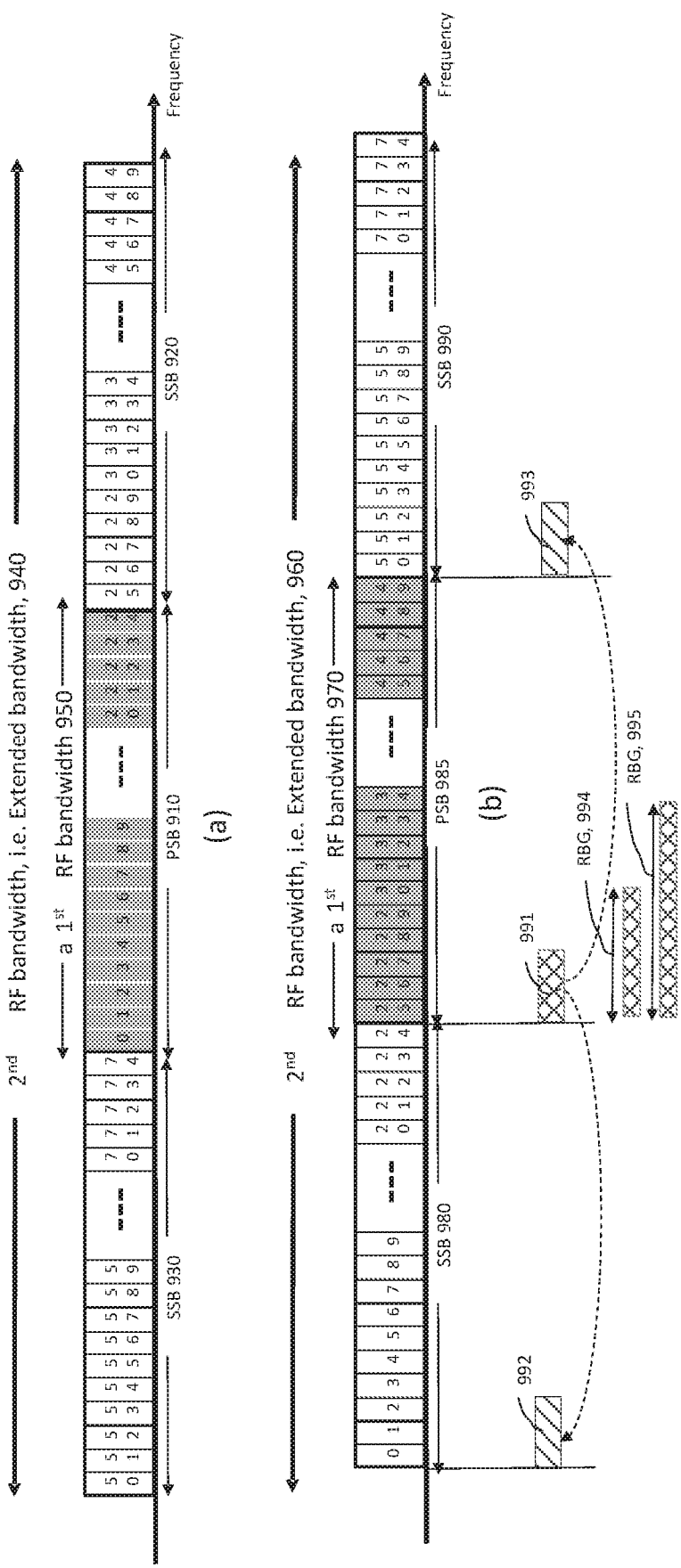
FIG. 9 illustrates resource allocation scheme for BWA operation, in accordance with an example.

FIG. 9 illustrates a resource allocation scheme for a BWA operation. According to certain aspects of the disclosure, the combination of the PSB 910, having a first RF bandwidth 950, and one or more SSBs 920, 930, or vice versa, can be regarded as a single component carrier (CC) with an extended bandwidth 950. In particular, a grant can allocate RBs within the extended RF bandwidth for a UE after triggering a BWA operation. A single HARQ process can apply to the extended RF bandwidth. For example, the PSB can convey the control region and the data region. In one example, the extended secondary subbands (SSB) can be used for data transmission only, without a control region. Data on an SSB can additionally be sent starting from the first OFDM symbol.

In one embodiment, the PRBs of a $2^{nd}$ RF bandwidth 940 can be numbered starting from the PSB 985 and extending to one or more SSBs, i.e. 980 and 990, as shown in FIG. 9. The PSB can, for example, include 25 PRBs with indices 0 to 24, an upper SSB 990 can include 25 PRBs with indices 25 to 49, and a lower SSB 980 can include 25 PRBs with indices 50 to 74. Alternatively, the PRBs of the $2^{nd}$ RF bandwidth 960 can be numbered starting from the lowest frequency, i.e. SSB 980 and then extending to PSB 985 and SSB 990. This example can also be utilized in a similar linear DCI format, for SSB 930, and SSB 920.

In one embodiment, the PRBs can be divided into resources block groups (RBG), each consisting of up to P consecutive RBs, where P is a positive integer that is the RBG size and is dependent on the RF bandwidth. The RBG size for the $1^{st}$ RF bandwidth, before a BWA operation, is denoted as, $P_1$ and the RBG size, which is determined by the $1^{st}$ RF bandwidth. In accordance, the RBG size for the $2^{nd}$ RF bandwidth, after BWA operation, can be denoted as $P_2$, and can be determined by various manners. In some examples, for RBG-based resource allocation, the RBG size of the $2^{nd}$ RF bandwidth can also be determined by the $1^{st}$ RF bandwidth, that is $P_1=P_2$. With this design, the resource allocation field e.g. bitmap, length can be increased according to the number of bits used to convey the resource allocation before a BWA operation.

In other examples, some RBGs in the 1$^{st}$ RF bandwidth (e.g. RBG 991 in FIG. 9) and RBGs in SSBs (e.g. RBG 992 and 993) can be grouped and paired for scheduling. In other words, once RBG 991 in the 1$^{st}$ RF bandwidth is explicitly scheduled and the associated RBGs in the SSBs within the 2$^{nd}$ RF bandwidth are also scheduled.

In some other examples, the value of $P_2$ can be determined based on the 2$^{nd}$ RF bandwidth, as shown in FIG. 9. Especially, the value of $P_2$ (e.g. RBG 995 in FIG. 9) can be rounded up to the nearest value that is an integer multiple of $P_1$ (e.g. RBG 994 in FIG. 9) to avoid the resource allocation hole.

In one embodiment, separate DCI formats can be used for resource allocation on different subbands, i.e. PSB and SSBs respectively. In some examples of the UEs-group-specific DCI format approach, the information regarding PDCCH's aggregation level and/or resource to convey DCI formats used to schedule resource allocation on SSBs, can be transmitted in the UEs-group-specific DCI by means of one or more reserved fields, 840, 850 and 860, for different UEs, as illustrated with the corresponding FIG. 8.

Figure 10:
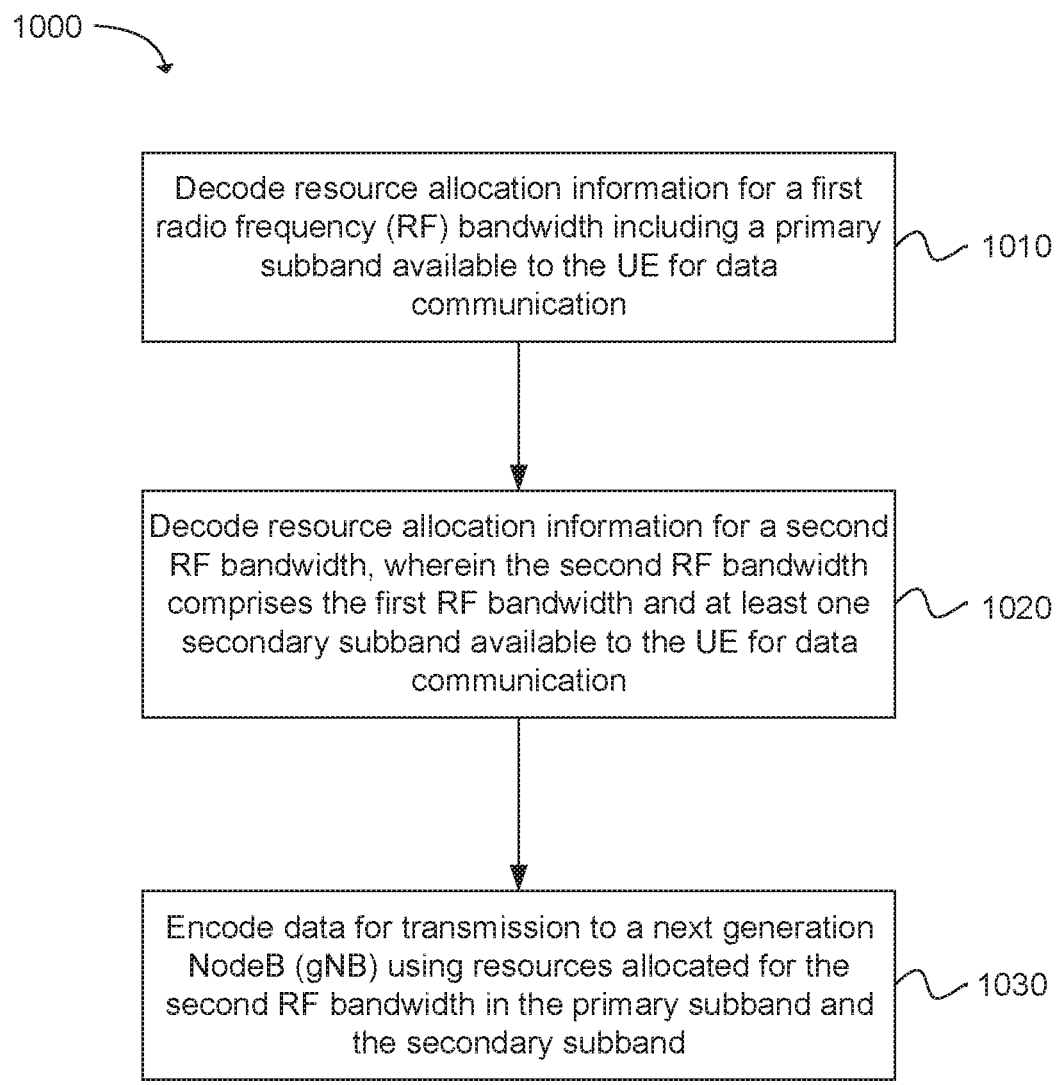
FIG. 10 depicts functionality of a user equipment (UE) configured for bandwidth adaptation (BWA) in accordance with an example.

FIG. 10 depicts functionality 1000 of a user equipment (UE) configured for bandwidth adaptation (BWA). The UE can comprise of one or more processors configured to decode resource allocation information for a first radio frequency (RF) bandwidth including a primary subband available to the UE for data communication 1010. The UE can comprise of one or more processors configured to decode resource allocation information for a second RF bandwidth, wherein the second RF bandwidth comprises the first RF bandwidth and at least one secondary subband available to the UE for data communication 1020. The UE can comprise of one or more processors configured to encode data for transmission to a next generation NodeB (gNB) using resources allocated for the second RF bandwidth in the primary subband and the secondary subband 1030.

In one embodiment, the one or more processors are further configured to decode the resource allocation information for the second RF bandwidth comprising: decode a bandwidth adaptation (BWA) media access control (MAC) element (CE); and identify the resource allocation information for the second bandwidth in the BWA MAC CE.

In one embodiment, the BWA MAC CE comprises: a set of fields, Ci, wherein each field indicates when a subband with a subbandIndex i is included in the second RF bandwidth using a binary indication, wherein i is a positive integer.

In one embodiment the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

In one embodiment, the BWA MAC CE comprises: a set of subband indication fields comprising a subband index value (SBIV) having: a starting subband and a subband length; or an implicit starting location as the primary subband and an ending subband index value relative to the implicit starting location.

In one embodiment, the one or more processors are further configured to decode the resource allocation information for the first RF bandwidth and the second RF bandwidth comprising: determine an RF bandwidth upon detection of a physical downlink control channel (PDCCH) intended for the UE; and determine, at the UE, the resource allocation within the determined RF bandwidth.

In one embodiment, the second RF bandwidth comprises the step of decoding an X-bit BWA indicator field (BWA-IF) in a downlink control information (DCI) format that is mapped on a UE-specific search space (USS), wherein the X-bit BWA-IF includes a bitmap with a length equal to a number of subbands or RF bandwidths configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

In one embodiment, the one or more processors are further configured to decode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

In one embodiment, the one or more processors are further configured to decode information in the PBICH, wherein the PBICH includes an orthogonal cover code (OCC) sequence for a Demodulation Reference Signal (DMRS) that correspond to DMRS used for information symbols in the PBICH, wherein, a PBICH channel is transmitted on a group of resource blocks (RBG) and a size of the RBG is either fixed or signaled through system information.

In one embodiment, the one or more processors are further configured to decode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

In one embodiment, the one or more processors are further configured to decode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

In one embodiment, the physical resource blocks (PRBs) for the second RF bandwidth are numbered in a predefined order; are numbered starting from the primary subband and extend to secondary subbands that are aggregated with the primary subband; or are numbered starting from a lowest frequency to a highest frequency.

In one embodiment, the one or more processors are further configured to decode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Figure 11:
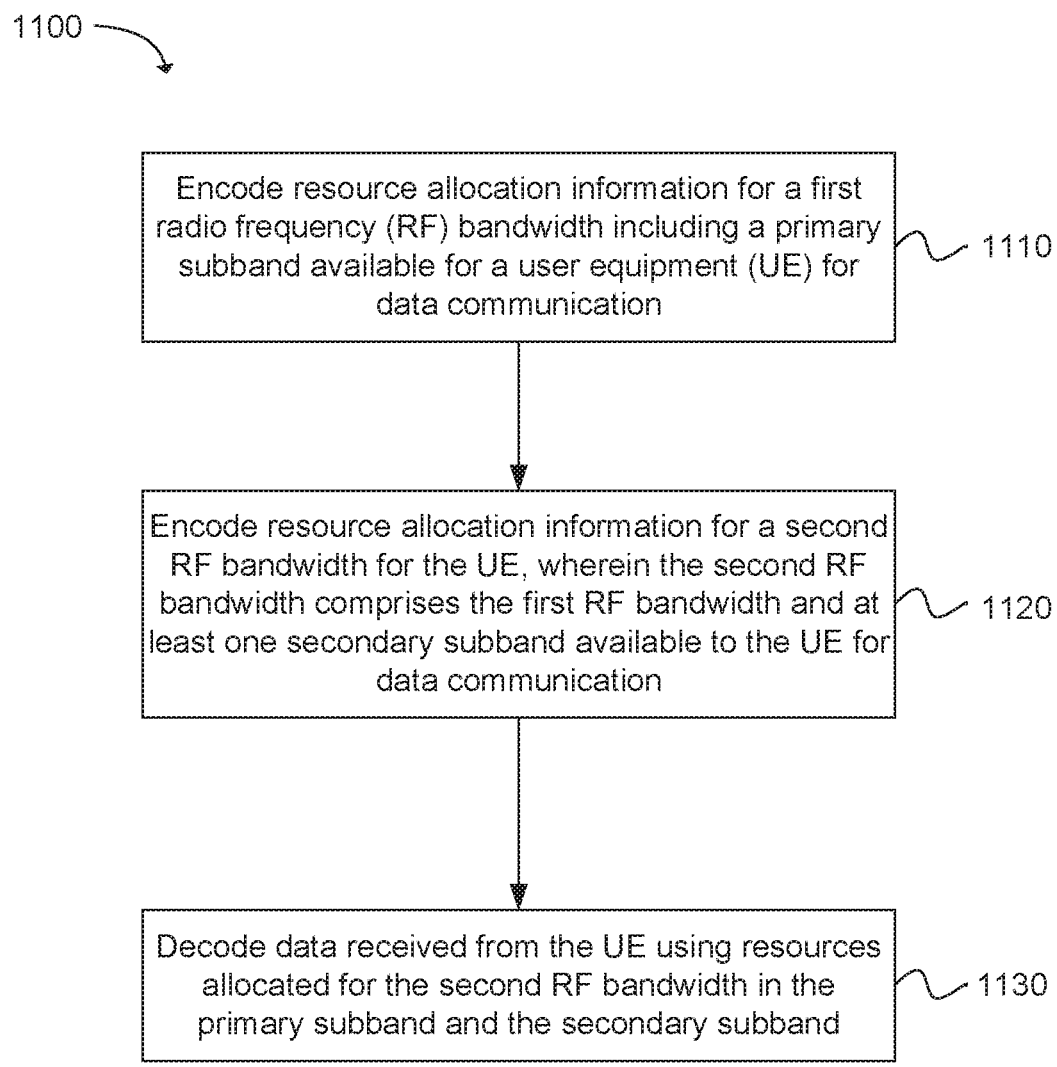
FIG. 11 depicts functionality of a next generation node B (gNB) configured for bandwidth adaptation (BWA) in accordance with an example.

FIG. 11 depicts functionality 1100 of a next generation node B (gNB) configured for bandwidth adaptation (BWA). The gNB can comprise of one or more processors configured to encode resource allocation information for a first radio frequency (RF) bandwidth including a primary subband available for a user equipment (UE) for data communication 1110. The gNB can comprise of one or more processors configured to encode resource allocation information for a second RF bandwidth for the UE, wherein the second RF bandwidth comprises the first RF bandwidth and at least one secondary subband available to the UE for data communication 1120. The gNB can comprise of one or more processors configured to decode data received from the UE using resources allocated for the second RF bandwidth in the primary subband and the secondary subband 1130.

In one embodiment, the one or more processors are further configured to encode the resource allocation information for the second RF bandwidth comprising: encode a bandwidth adaptation (BWA) media access control (MAC) element (CE) that includes the resource allocation information for the second bandwidth in the BWA MAC CE.

In one embodiment, the BWA MAC CE comprises: a set of fields, Ci, wherein each field indicates when a subband with a subbandIndex i is included in the second RF bandwidth using a binary indication, wherein i is a positive integer.

In one embodiment, the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

In one embodiment, the BWA MAC CE comprises: a set of subband indication fields comprising a subband index value (SBIV) having: a starting subband and a subband length; or an implicit starting location as the primary subband and an ending subband index value relative to the implicit starting location.

In one embodiment, the one or more processors are further configured to encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

In one embodiment, the one or more processors are further configured to encode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

In one embodiment, the one or more processors are further configured to encode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

In one embodiment, the one or more processors are further configured to encode the resource allocation information for the second RF bandwidth comprising an X-bit BWA indicator field (BWA-IF) configured in a set of physical bandwidth indicator channels (PBICH) using higher layer signaling, wherein each PBICH is identified by a cyclic shift (CS) index value.

In one embodiment, the one or more processors are further configured to encode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

In one embodiment, physical resource blocks (PRBs) for the second RF bandwidth: are numbered in a predefined order; are numbered starting from the primary subband and extend to secondary subbands that are aggregated with the primary subband; or are numbered starting from a lowest frequency to a highest frequency.

In one embodiment, the one or more processors are further configured to encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Figure 12:
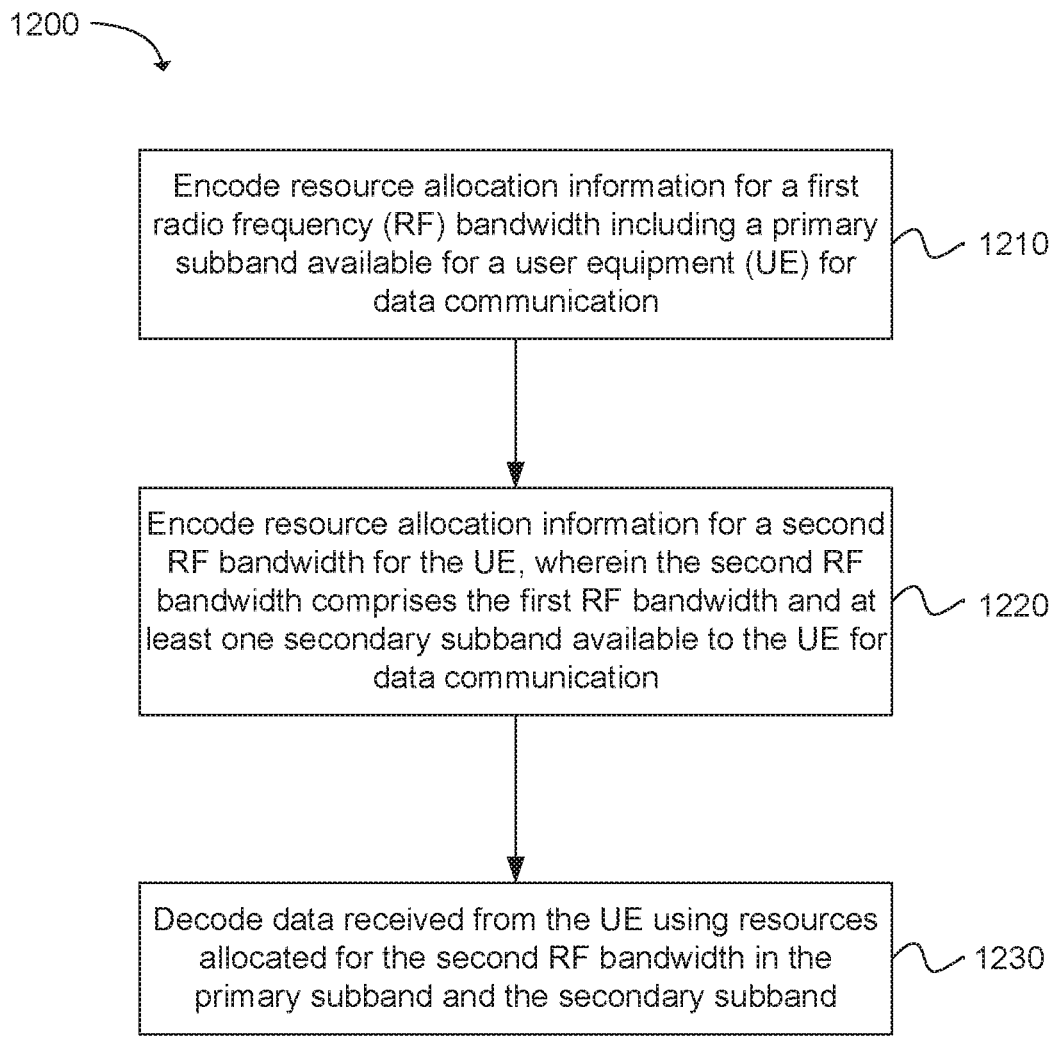
FIG. 12 depicts functionality of an example embodiment of a next generation node B (gNB) configured for bandwidth adaptation (BWA) in accordance with an example.

FIG. 12 depicts functionality 1200 of an example embodiment of a next generation node B (gNB) configured for bandwidth adaptation (BWA). The gNB can comprise of one or more processors configured to encode resource allocation information for a first radio frequency (RF) bandwidth including a primary subband available for a user equipment (UE) for data communication 1210. The gNB can comprise of one or more processors configured to encode resource allocation information for a second RF bandwidth for the UE, wherein the second RF bandwidth comprises the first RF bandwidth and at least one secondary subband available to the UE for data communication 1220. The gNB can comprise of one or more processors configured to decode data received from the UE using resources allocated for the second RF bandwidth in the primary subband and the secondary subband 1230.

In one embodiment, the one or more processors are further configured to encode the resource allocation information for the second RF bandwidth comprising: encode a bandwidth adaptation (BWA) media access control (MAC) element (CE) that includes the resource allocation information for the second bandwidth in the BWA MAC CE.

In one embodiment, the one or more processors are further configured to encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

In one embodiment, the one or more processors are further configured to encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Figure 13:
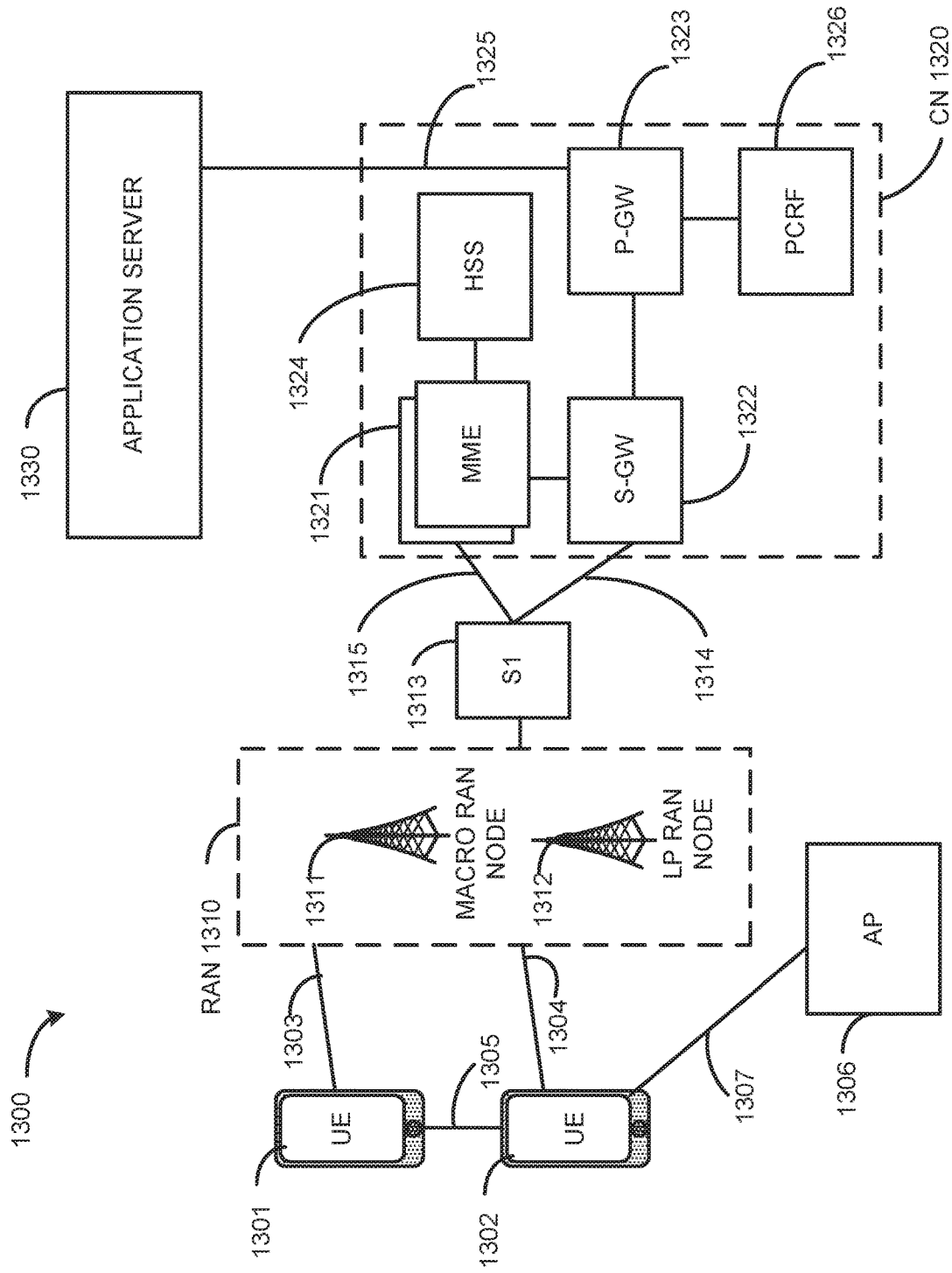
FIG. 13 illustrates an architecture of a network in accordance with an example.

FIG. 13 illustrates an architecture of a system 1300 of a network in accordance with some embodiments. The system 1300 is shown to include a user equipment (UE) 1301 and a UE 1302. The UEs 1301 and 1302 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 1301 and 1302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 and 1302 may be configured to connect, e.g., communicatively couple, with a radio access network (RAN) 1310—the RAN 1310 may be, for example, an Evolved Universal Mobile Telecommunications System (UMTS) Terrestrial Radio Access Network (E-UTRAN), a Ne8Gen RAN (NG RAN), or some other type of RAN. The UEs 1301 and 1302 utilize connections 1303 and 1304, respectively, each of which comprises a physical communications interface or layer (discussed in further detail below); in this example, the connections 1303 and 1304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1301 and 1302 may further directly exchange communication data via a ProSe interface 1305. The ProSe interface 1305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1302 is shown to be configured to access an access point (AP) 1306 via connection 1307. The connection 1307 can comprise a local wireless connection, such as a connection consistent with any IEEE 802.11 protocol, wherein the AP 1306 would comprise a wireless fidelity (WiFi®) router. In this example, the AP 1306 is shown to be connected to the Internet without connecting to the core network of the wireless system (described in further detail below).

The RAN 1310 can include one or more access nodes that enable the connections 1303 and 1304. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 1310 may include one or more RAN nodes for providing macrocells, e.g., macro RAN node 1311, and one or more RAN nodes for providing femtocells or picocells (e.g., cells having smaller coverage areas, smaller user capacity, or higher bandwidth compared to macrocells), e.g., low power (LP) RAN node 1312.

Any of the RAN nodes 1311 and 1312 can terminate the air interface protocol and can be the first point of contact for the UEs 1301 and 1302. In some embodiments, any of the RAN nodes 1311 and 1312 can fulfill various logical functions for the RAN 1310 including, but not limited to, radio network controller (RNC) functions such as radio bearer management, uplink and downlink dynamic radio resource management and data packet scheduling, and mobility management.

In accordance with some embodiments, the UEs 1301 and 1302 can be configured to communicate using Orthogonal Frequency-Division Multiplexing (OFDM) communication signals with each other or with any of the RAN nodes 1311 and 1312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 and 1312 to the UEs 1301 and 1302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1301 and 1302. The physical downlink control channel (PDCCH) may carry information about the transport format and resource allocations related to the PDSCH channel, among other things. It may also inform the UEs 1301 and 1302 about the transport format, resource allocation, and H-ARQ (Hybrid Automatic Repeat Request) information related to the uplink shared channel. Typically, downlink scheduling (assigning control and shared channel resource blocks to the UE 1302 within a cell) may be performed at any of the RAN nodes 1311 and 1312 based on channel quality information fed back from any of the UEs 1301 and 1302. The downlink resource assignment information may be sent on the PDCCH used for (e.g., assigned to) each of the UEs 1301 and 1302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1310 is shown to be communicatively coupled to a core network (CN) 1320—via an S1 interface 1313. In embodiments, the CN 1320 may be an evolved packet core (EPC) network, a Ne8Gen Packet Core (NPC) network, or some other type of CN. In this embodiment the S1 interface 1313 is split into two parts: the S1-U interface 1314, which carries traffic data between the RAN nodes 1311 and 1312 and the serving gateway (S-GW) 1322, and the S1-mobility management entity (MME) interface 1315, which is a signaling interface between the RAN nodes 1311 and 1312 and MMEs 1321.

In this embodiment, the CN 1320 comprises the MMEs 1321, the S-GW 1322, the Packet Data Network (PDN) Gateway (P-GW) 1323, and a home subscriber server (HSS) 1324. The MMEs 1321 may be similar in function to the control plane of legacy Serving General Packet Radio Service (GPRS) Support Nodes (SGSN). The MMEs 1321 may manage mobility aspects in access such as gateway selection and tracking area list management. The HSS 1324 may comprise a database for network users, including subscription-related information to support the network entities' handling of communication sessions. The CN 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc.

The S-GW 1322 may terminate the S1 interface 1313 towards the RAN 1310, and routes data packets between the RAN 1310 and the CN 1320. In addition, the S-GW 1322 may be a local mobility anchor point for inter-RAN node handovers and also may provide an anchor for inter-3GPP mobility. Other responsibilities may include lawful intercept, charging, and some policy enforcement.

The P-GW 1323 may terminate a SGi interface toward a PDN. The P-GW 1323 may route data packets between the EPC network 1323 and e8ernal networks such as a network including the application server 1330 (alternatively referred to as application function (AF)) via an Internet Protocol (IP) interface 1325. Generally, the application server 1330 may be an element offering applications that use IP bearer resources with the core network (e.g., UMTS Packet Services (PS) domain, LTE PS data services, etc.). In this embodiment, the P-GW 1323 is shown to be communicatively coupled to an application server 1330 via an IP communications interface 1325. The application server 1330 can also be configured to support one or more communication services (e.g., Voice-over-Internet Protocol (VoIP) sessions, PTT sessions, group communication sessions, social networking services, etc.) for the UEs 1301 and 1302 via the CN 1320.

The P-GW 1323 may further be a node for policy enforcement and charging data collection. Policy and Charging Enforcement Function (PCRF) 1326 is the policy and charging control element of the CN 1320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate Quality of Service (QoS) and charging parameters. The PCRF 1326 may provision this rule into a Policy and Charging Enforcement Function (PCEF) (not shown) with the appropriate traffic flow template (TFT) and QoS class of identifier (QCI), which commences the QoS and charging as specified by the application server 1330.

Figure 14:
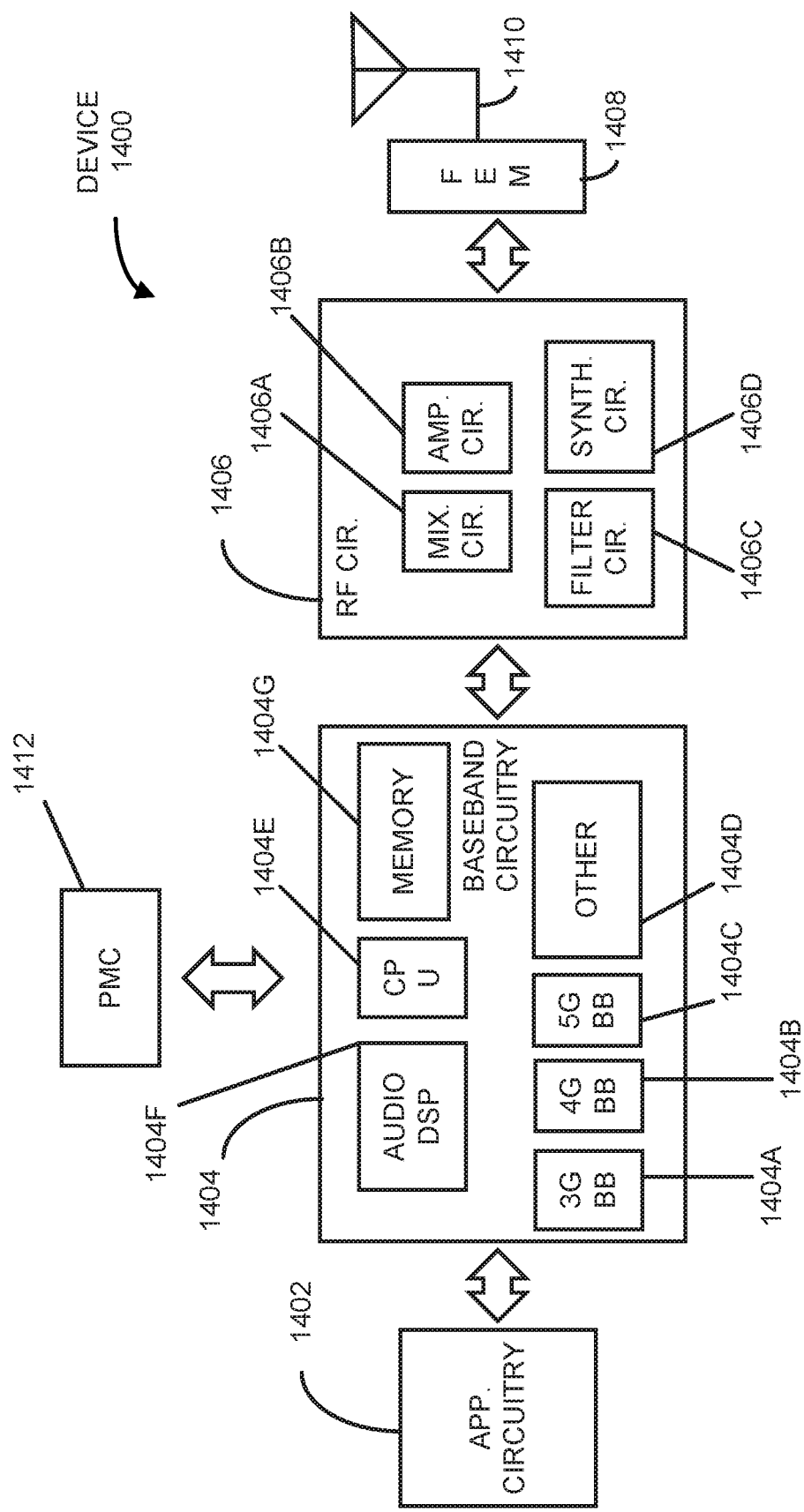
FIG. 14 illustrates a diagram of a wireless device (e.g., UE) and a base station (e.g., eNodeB) in accordance with an example.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband processing circuity 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404A, a fourth generation (4G) baseband processor 1404B, a fifth generation (5G) baseband processor 1404C, or other baseband processor(s) 1404D for other existing generations, generations in development or to be developed in the future (e.g., second generation (2G), sixth generation (6G), etc.). The baseband circuitry 1404 (e.g., one or more of baseband processors 1404A-D) may handle various radio control functions that enable communication with one or more radio networks via the RF circuitry 1406. In other embodiments, some or all of the functionality of baseband processors 1404A-D may be included in modules stored in the memory 1404G and executed via a Central Processing Unit (CPU) 1404E. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404F. The audio DSP(s) 1404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406a, amplifier circuitry 1406b and filter circuitry 1406c. In some embodiments, the transmit signal path of the RF circuitry 1406 may include filter circuitry 1406c and mixer circuitry 1406a. RF circuitry 1406 may also include synthesizer circuitry 1406d for synthesizing a frequency for use by the mixer circuitry 1406a of the receive signal path and the transmit signal path. In some embodiments, the mixer circuitry 1406a of the receive signal path may be configured to down-convert RF signals received from the FEM circuitry 1408 based on the synthesized frequency provided by synthesizer circuitry 1406d. The amplifier circuitry 1406b may be configured to amplify the down-converted signals and the filter circuitry 1406c may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a necessity. In some embodiments, mixer circuitry 1406a of the receive signal path may comprise passive mixers, although the scope of the embodiments is not limited in this respect.

In some embodiments, the mixer circuitry 1406a of the transmit signal path may be configured to up-convert input baseband signals based on the synthesized frequency provided by the synthesizer circuitry 1406d to generate RF output signals for the FEM circuitry 1408. The baseband signals may be provided by the baseband circuitry 1404 and may be filtered by filter circuitry 1406c.

In some embodiments, the mixer circuitry 1406a of the receive signal path and the mixer circuitry 1406a of the transmit signal path may include two or more mixers and may be arranged for quadrature downconversion and upconversion, respectively. In some embodiments, the mixer circuitry 1406a of the receive signal path and the mixer circuitry 1406a of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a necessity. Divider control input may be provided by either the baseband circuitry 1404 or the applications processor 1402 depending on the desired output frequency. In some embodiments, a divider control input (e.g., N) may be determined from a look-up table based on a channel indicated by the applications processor 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM 1408, or in both the RF circuitry 1406 and the FEM 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 1412 may be additionally or alternatively coupled with, and perform similar power management operations for, other components such as, but not limited to, application circuitry 1402, RF circuitry 1406, or FEM 1408.

In some embodiments, the PMC 1412 may control, or otherwise be part of, various power saving mechanisms of the device 1400. For example, if the device 1400 is in an RRC Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it can transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1404 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
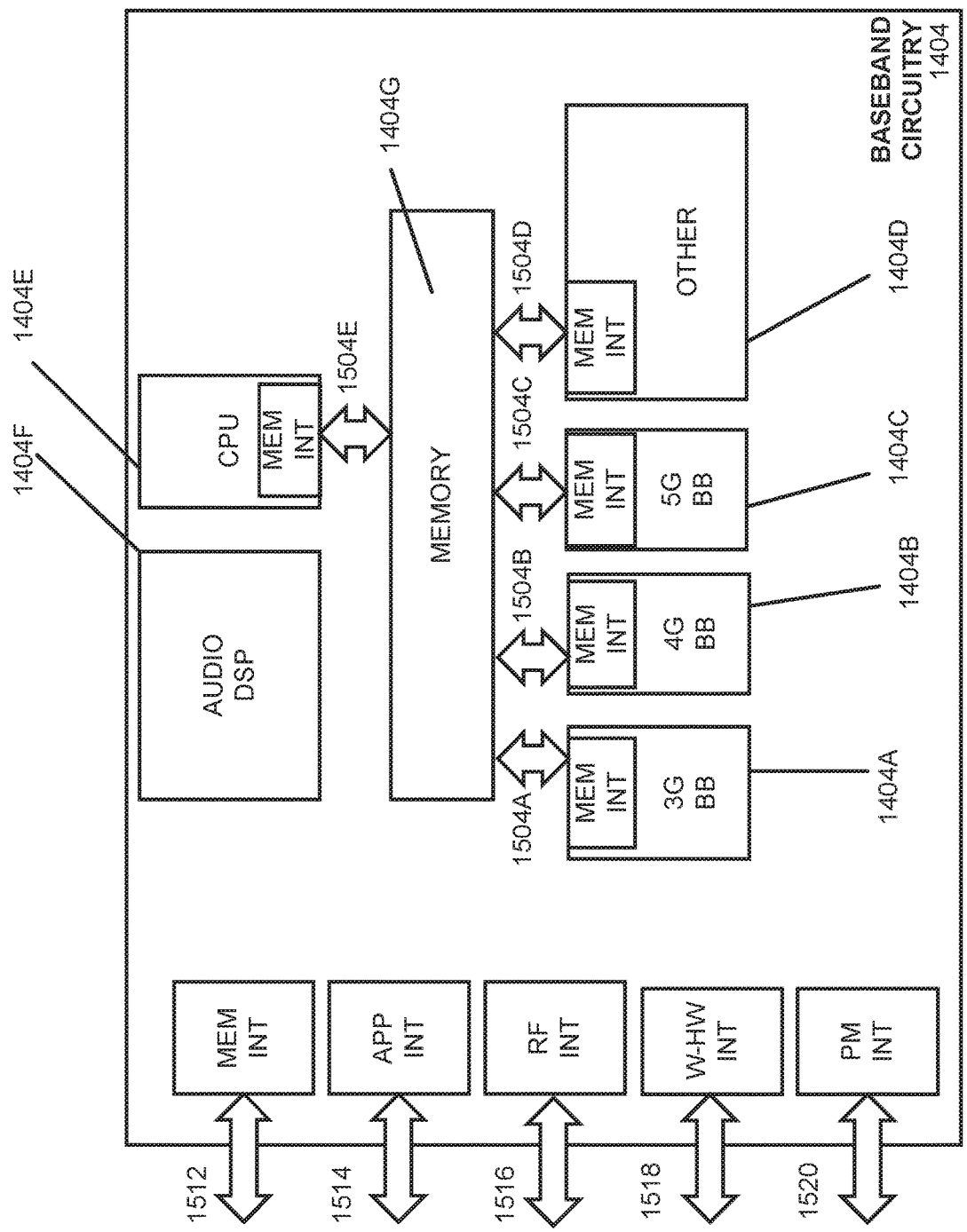
FIG. 15 illustrates example interfaces of baseband circuitry in accordance with an example.

FIG. 15 illustrates example interfaces of baseband circuitry in accordance with some embodiments. As discussed above, the baseband circuitry 1404 of FIG. 14 may comprise processors 1404A-1404E and a memory 1404G utilized by said processors. Each of the processors 1404A-1404E may include a memory interface, 1504A-1504E, respectively, to send/receive data to/from the memory 1404G.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412.

Figure 16:
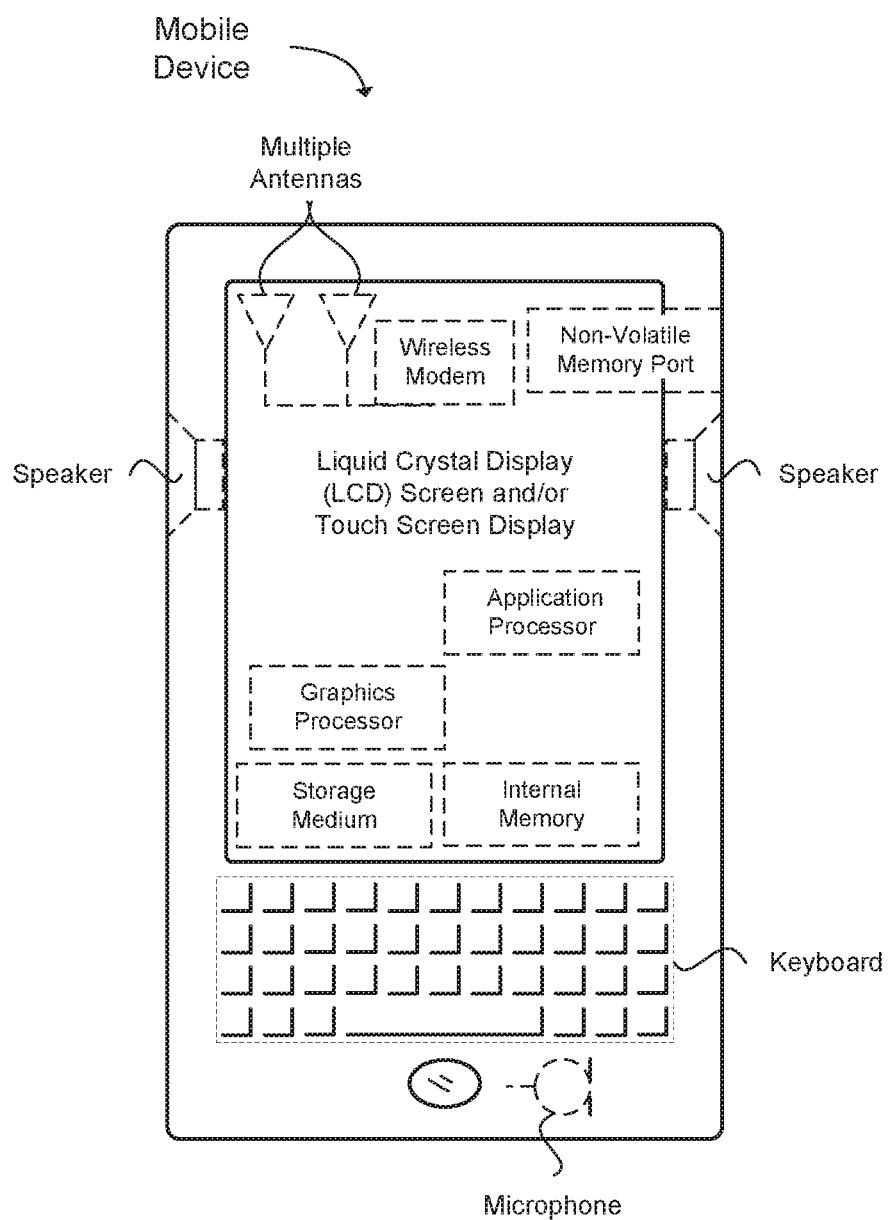
FIG. 16 illustrates a diagram of a wireless device (e.g., UE) in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) configured for bandwidth adaptation (BWA), the apparatus comprising: one or more processors configured to: decode resource allocation information for a first radio frequency (RF) bandwidth including a primary subband available to the UE for data communication; decode resource allocation information for a second RF bandwidth, wherein the second RF bandwidth comprises the first RF bandwidth and at least one secondary subband available to the UE for data communication; and encode data for transmission to a next generation NodeB (gNB) using resources allocated for the second RF bandwidth in the primary subband and the secondary subband; and a memory interface configured to send to a memory the resource allocation information for the first RF bandwidth and the second RF bandwidth.

Example 2 includes the apparatus of example 1, wherein the one or more processors are further configured to: decode the resource allocation information for the second RF bandwidth comprising: decode a bandwidth adaptation (BWA) media access control (MAC) element (CE); and identify the resource allocation information for the second bandwidth in the BWA MAC CE.

Example 3 includes the apparatus of example 1 or 2, wherein the BWA MAC CE comprises: a set of fields, Ci, wherein each field indicates when a subband with a subbandIndex i is included in the second RF bandwidth using a binary indication, wherein i is a positive integer.

Example 4 includes the apparatus of example 2, wherein the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

Example 5 includes the apparatus of example 2, wherein the BWA MAC CE comprises: a set of subband indication fields comprising a subband index value (SBIV) having: a starting subband and a subband length; or an implicit starting location as the primary subband and an ending subband index value relative to the implicit starting location.

Example 6 includes the apparatus of example 1 or 2, wherein the one or more processors are further configured to: decode the resource allocation information for the first RF bandwidth and the second RF bandwidth comprising: determine an RF bandwidth upon detection of a physical downlink control channel (PDCCH) intended for the UE; and determine, at the UE, the resource allocation within the determined RF bandwidth.

Example 7 includes the apparatus of example 6, further comprising determining the second RF bandwidth comprising: decoding an X-bit BWA indicator field (BWA-IF) in a downlink control information (DCI) format that is mapped on a UE-specific search space (USS), wherein: the X-bit BWA-IF includes a bitmap with a length equal to a number of subbands or RF bandwidths configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 8 includes the apparatus of example 1 or 2, wherein the one or more processors are further configured to: decode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 9 includes the apparatus of example 8, wherein the one or more processors are further configured to: decode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

Example 10 includes the apparatus of example 1 or 2, wherein the one or more processors are further configured to: decode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

Example 11 includes the apparatus of example 1 or 6, wherein the one or more processors are further configured to: decode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

Example 12 includes the apparatus of example 1, wherein physical resource blocks (PRBs) for the second RF bandwidth: are numbered in a predefined order; are numbered starting from the primary subband and extend to secondary subbands that are aggregated with the primary subband; or are numbered starting from a lowest frequency to a highest frequency.

Example 13 includes the apparatus of example 1, wherein the one or more processors are further configured to: decode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 14 includes an apparatus of a next generation node B (gNB) configured for bandwidth adaptation (BWA), the apparatus comprising: one or more processors configured to: encode resource allocation information for a first radio frequency (RF) bandwidth including a primary subband available for a user equipment (UE) for data communication; encode resource allocation information for a second RF bandwidth for the UE, wherein the second RF bandwidth comprises the first RF bandwidth and at least one secondary subband available to the UE for data communication; and decode data received from the UE using resources allocated for the second RF bandwidth in the primary subband and the secondary subband; and a memory interface configured to send to a memory the resource allocation information for the first RF bandwidth and the second RF bandwidth for the UE.

Example 15 includes the apparatus of example 14, wherein the one or more processors are further configured to: encode the resource allocation information for the second RF bandwidth comprising: encode a bandwidth adaptation (BWA) media access control (MAC) element (CE) that includes the resource allocation information for the second bandwidth in the BWA MAC CE.

Example 16 includes the apparatus of example 15, wherein the BWA MAC CE comprises: a set of fields, Ci, wherein each field indicates when a subband with a subbandIndex i is included in the second RF bandwidth using a binary indication, wherein i is a positive integer.

Example 17 includes the apparatus of example 15, wherein the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

Example 18 includes the apparatus of example 15, wherein the BWA MAC CE comprises: a set of subband indication fields comprising a subband index value (SBIV) having: a starting subband and a subband length; or an implicit starting location as the primary subband and an ending subband index value relative to the implicit starting location.

Example 19 includes the apparatus of example 14 or 15, wherein the one or more processors are further configured to: encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 20 includes the apparatus of example 14 or 15, wherein the one or more processors are further configured to: encode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 21 includes the apparatus of example 20, wherein the one or more processors are further configured to: encode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

Example 22 includes the apparatus of example 14 or 15, wherein the one or more processors are further configured to: encode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

Example 23 includes the apparatus of example 14, wherein the one or more processors are further configured to: encode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

Example 24 includes the apparatus of example 14, wherein physical resource blocks (PRBs) for the second RF bandwidth: are numbered in a predefined order; are numbered starting from the primary subband and extend to secondary subbands that are aggregated with the primary subband; or are numbered starting from a lowest frequency to a highest frequency.

Example 25 includes the apparatus of example 14, wherein the one or more processors are further configured to: encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 26 includes an apparatus of a next generation node B (gNB) configured for bandwidth adaptation (BWA), the apparatus comprising: one or more processors configured to: encode resource allocation information for a first radio frequency (RF) bandwidth including a primary subband available for a user equipment (UE) for data communication; encode resource allocation information for a second RF bandwidth for the UE, wherein the second RF bandwidth comprises the first RF bandwidth and at least one secondary subband available to the UE for data communication; and decode data received from the UE using resources allocated for the second RF bandwidth in the primary subband and the secondary subband; and a memory interface configured to send to a memory the resource allocation information for the first RF bandwidth and the second RF bandwidth for the UE.

Example 27 includes the apparatus of example 26, wherein the one or more processors are further configured to: encode the resource allocation information for the second RF bandwidth comprising: encode a bandwidth adaptation (BWA) media access control (MAC) element (CE) that includes the resource allocation information for the second bandwidth in the BWA MAC CE.

Example 28 includes the apparatus of example 26 or 27, wherein the one or more processors are further configured to: encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 29 includes the apparatus of example 26, wherein the one or more processors are further configured to: encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 30 includes an apparatus of a user equipment (UE) configured for bandwidth adaptation (BWA), the apparatus comprising: one or more processors configured to: decode resource allocation information for a first radio frequency (RF) bandwidth including a primary subband available to the UE for data communication; decode resource allocation information for a second RF bandwidth, wherein the second RF bandwidth comprises the first RF bandwidth and at least one secondary subband available to the UE for data communication; and encode data for transmission to a next generation NodeB (gNB) using resources allocated for the second RF bandwidth in the primary subband and the secondary subband; and a memory interface configured to send to a memory the resource allocation information for the first RF bandwidth and the second RF bandwidth.

Example 31 includes the apparatus of example 30, wherein the one or more processors are further configured to: decode the resource allocation information for the second RF bandwidth comprising: decode a bandwidth adaptation (BWA) media access control (MAC) element (CE); and identify the resource allocation information for the second bandwidth in the BWA MAC CE.

Example 32 includes the apparatus of example 30 or 31, wherein the BWA MAC CE comprises: a set of fields, Ci, wherein each field indicates when a subband with a subbandIndex i is included in the second RF bandwidth using a binary indication, wherein i is a positive integer.

Example 33 includes the apparatus of example 31, wherein the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

Example 34 includes the apparatus of example 31, wherein the BWA MAC CE comprises: a set of subband indication fields comprising a subband index value (SBIV) having: a starting subband and a subband length; or an implicit starting location as the primary subband and an ending subband index value relative to the implicit starting location.

Example 35 includes the apparatus of example 30 or 31, wherein the one or more processors are further configured to: decode the resource allocation information for the first RF bandwidth and the second RF bandwidth comprising: determine an RF bandwidth upon detection of a physical downlink control channel (PDCCH) intended for the UE; and determine, at the UE, the resource allocation within the determined RF bandwidth.

Example 36 includes the apparatus of example 35, further comprising determining the second RF bandwidth comprising: decoding an X-bit BWA indicator field (BWA-IF) in a downlink control information (DCI) format that is mapped on a UE-specific search space (USS), wherein: the X-bit BWA-IF includes a bitmap with a length equal to a number of subbands or RF bandwidths configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 37 includes the apparatus of example 30 or 31, wherein the one or more processors are further configured to: decode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 38 includes the apparatus of example 37, wherein the one or more processors are further configured to: decode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

Example 39 includes the apparatus of example 30 or 31, wherein the one or more processors are further configured to: decode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

Example 40 includes the apparatus of example 30 or 35, wherein the one or more processors are further configured to: decode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

Example 41 includes the apparatus of example 30, wherein physical resource blocks (PRBs) for the second RF bandwidth: are numbered in a predefined order; are numbered starting from the primary subband and extend to secondary subbands that are aggregated with the primary subband; or are numbered starting from a lowest frequency to a highest frequency.

Example 42 includes the apparatus of example 30, wherein the one or more processors are further configured to: decode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 43 includes an apparatus of a next generation node B (gNB) configured for bandwidth adaptation (BWA), the apparatus comprising: one or more processors configured to: encode resource allocation information for a first radio frequency (RF) bandwidth including a primary subband available for a user equipment (UE) for data communication; encode resource allocation information for a second RF bandwidth for the UE, wherein the second RF bandwidth comprises the first RF bandwidth and at least one secondary subband available to the UE for data communication; and decode data received from the UE using resources allocated for the second RF bandwidth in the primary subband and the secondary subband; and a memory interface configured to send to a memory the resource allocation information for the first RF bandwidth and the second RF bandwidth for the UE.

Example 44 includes the apparatus of example 43, wherein the one or more processors are further configured to: encode the resource allocation information for the second RF bandwidth comprising: encode a bandwidth adaptation (BWA) media access control (MAC) element (CE) that includes the resource allocation information for the second bandwidth in the BWA MAC CE.

Example 45 includes the apparatus of example 44, wherein the BWA MAC CE comprises: a set of fields, Ci, wherein each field indicates when a subband with a subbandIndex i is included in the second RF bandwidth using a binary indication, wherein i is a positive integer.

Example 46 includes the apparatus of example 44, wherein the BWA MAC CE comprises: a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

Example 47 includes the apparatus of example 44, wherein the BWA MAC CE comprises: a set of subband indication fields comprising a subband index value (SBIV) having: a starting subband and a subband length; or an implicit starting location as the primary subband and an ending subband index value relative to the implicit starting location.

Example 48 includes the apparatus of example 43 or 44, wherein the one or more processors are further configured to: encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 49 includes the apparatus of example 43 or 44, wherein the one or more processors are further configured to: encode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 50 includes the apparatus of example 49, wherein the one or more processors are further configured to: encode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

Example 51 includes the apparatus of example 43 or 44, wherein the one or more processors are further configured to: encode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

Example 52 includes the apparatus of example 43, wherein the one or more processors are further configured to: encode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

Example 53 includes the apparatus of example 43, wherein physical resource blocks (PRBs) for the second RF bandwidth: are numbered in a predefined order; are numbered starting from the primary subband and extend to secondary subbands that are aggregated with the primary subband; or are numbered starting from a lowest frequency to a highest frequency.

Example 54 includes the apparatus of example 43, wherein the one or more processors are further configured to: encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 55 includes an apparatus of a next generation node B (gNB) configured for bandwidth adaptation (BWA), the apparatus comprising: one or more processors configured to: encode resource allocation information for a first radio frequency (RF) bandwidth including a primary subband available for a user equipment (UE) for data communication; encode resource allocation information for a second RF bandwidth for the UE, wherein the second RF bandwidth comprises the first RF bandwidth and at least one secondary subband available to the UE for data communication; and decode data received from the UE using resources allocated for the second RF bandwidth in the primary subband and the secondary subband; and a memory interface configured to send to a memory the resource allocation information for the first RF bandwidth and the second RF bandwidth for the UE.

Example 56 includes the apparatus of example 55, wherein the one or more processors are further configured to: encode the resource allocation information for the second RF bandwidth comprising: encode a bandwidth adaptation (BWA) media access control (MAC) element (CE) that includes the resource allocation information for the second bandwidth in the BWA MAC CE.

Example 57 includes the apparatus of example 55 or 56, wherein the one or more processors are further configured to: encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 58 includes the apparatus of example 55, wherein the one or more processors are further configured to: encode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 59 includes an apparatus of a user equipment (UE) configured for bandwidth adaptation (BWA), the apparatus comprising: one or more processors configured to: decode resource allocation information for a first radio frequency (RF) bandwidth including a primary subband available to the UE for data communication; decode resource allocation information for a second RF bandwidth, wherein the second RF bandwidth comprises the first RF bandwidth and at least one secondary subband available to the UE for data communication; and encode data for transmission to a next generation NodeB (gNB) using resources allocated for the second RF bandwidth in the primary subband and the secondary subband; and a memory interface configured to send to a memory the resource allocation information for the first RF bandwidth and the second RF bandwidth.

Example 60 includes the apparatus of example 59, wherein the one or more processors are further configured to: decode the resource allocation information for the second RF bandwidth comprising: decode a bandwidth adaptation (BWA) media access control (MAC) element (CE); and identify the resource allocation information for the second bandwidth in the BWA MAC CE wherein the BWA MAC CE comprises: a set of fields, Ci, wherein each field indicates when a subband with a subbandIndex i is included in the second RF bandwidth using a binary indication, wherein i is a positive integer.

Example 61 includes the apparatus of example 60, wherein the BWA MAC CE comprises: a subband group (SG) indication identifying one or more SGs and a subband group within the second RF bandwidth; a set of fields, Ci, wherein each field indicates when a subband with a subbandIndex i within the indicated SG is included in the second RF bandwidth using a binary indication, wherein i is a positive integer; and a set of subband indication fields comprising a subband index value (SBIV) having: a starting subband and a subband length; or an implicit starting location as the primary subband and an ending subband index value relative to the implicit starting location.

Example 62 includes the apparatus of example 59 or 60, wherein the one or more processors are further configured to: decode the resource allocation information for the first RF bandwidth and the second RF bandwidth comprising: determine an RF bandwidth upon detection of a physical downlink control channel (PDCCH) intended for the UE; and determine, at the UE, the resource allocation within the determined RF bandwidth.

Example 63 includes the apparatus of example 62, further comprising determining the second RF bandwidth comprising: decoding an X-bit BWA indicator field (BWA-IF) in a downlink control information (DCI) format that is mapped on a UE-specific search space (USS), wherein: the X-bit BWA-IF includes a bitmap with a length equal to a number of subbands or RF bandwidths configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling.

Example 64 includes the apparatus of example 59 or 60, wherein the one or more processors are further configured to: decode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}$, $n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 65 includes the apparatus of example 64, wherein the one or more processors are further configured to: decode information in the PBICH, wherein the PBICH includes an orthogonal cover code (OCC) sequence for a Demodulation Reference Signal (DMRS) that correspond to DMRS used for information symbols in the PBICH, wherein, a PBICH channel is transmitted on a group of resource blocks (RBG) and a size of the RBG is either fixed or signaled through system information; and decode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value.

Example 66 includes the apparatus of example 59 or 62, wherein the one or more processors are further configured to: decode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level; and decode resource allocation information for the first RF bandwidth and the second RF bandwidth, wherein the first RF bandwidth has a resource block group size, P1, and the second RF bandwidth has a resource block group size, P2, wherein P1 and P2 are positive integers, wherein: P1 and P2 are selected based on a bandwidth of a the first RF bandwidth and the second RF bandwidth respectively; P1 is equal to P2; or P2 is an integer multiple of P1.

Example 67 includes an apparatus of a next generation node B (gNB) configured for bandwidth adaptation (BWA), the apparatus comprising: one or more processors configured to: encode resource allocation information for a first radio frequency (RF) bandwidth including a primary subband available for a user equipment (UE) for data communication; encode resource allocation information for a second RF bandwidth for the UE, wherein the second RF bandwidth comprises the first RF bandwidth and at least one secondary subband available to the UE for data communication; and decode data received from the UE using resources allocated for the second RF bandwidth in the primary subband and the secondary subband; and a memory interface configured to send to a memory the resource allocation information for the first RF bandwidth and the second RF bandwidth for the UE.

Example 68 includes the apparatus of example 67, wherein the one or more processors are further configured to: encode the resource allocation information for the second RF bandwidth comprising: encode a bandwidth adaptation (BWA) media access control (MAC) element (CE) that includes the resource allocation information for the second bandwidth in the BWA MAC CE.

Example 69 includes the apparatus of example 68, wherein the BWA MAC CE comprises: a set of fields, Ci, wherein each field indicates when a subband with a subbandIndex i is included in the second RF bandwidth using a binary indication, wherein i is a positive integer; a subband group (SG) indication identifying one or more SGs and a subband group within the second RF bandwidth; and a set of fields, Ci, wherein each field indicates when a subband with a subbandIndex i within the indicated SG is included in the second RF bandwidth using a binary indication, wherein i is a positive integer.

Example 70 includes the apparatus of example 68, wherein the BWA MAC CE comprises: a set of subband indication fields comprising a subband index value (SBIV) having: a starting subband and a subband length; or an implicit starting location as the primary subband and an ending subband index value relative to the implicit starting location.

Example 71 includes the apparatus of example 67, wherein the one or more processors are further configured to: encode the resource allocation information for the second RF bandwidth comprising: an X-bit BWA indicator field (BWA-IF) in a downlink control information (DCI) format that is mapped on a UE-specific search space (USS), wherein: the X-bit BWA-IF includes a bitmap with a length equal to a number of subbands configured for a selected UE; the X-bit BWA-IF includes a bitmap with a length equal to a number of subbands in a subband group (SG) in the primary subband; or the X-bit BWA-IF includes a set of predetermined values used to indicate one of a plurality of sets subbands that are configured by higher layer signaling; and encode the resource allocation information for the second RF bandwidth comprising: an X-bit BWA indicator field (BWA-IF) configured for communication in a physical bandwidth indicator channel (PBICH), as BWA indicator bits of the BWA-IF that are configured to be modulated using binary phase shift key (BPSK) or quadrature phase shift key (QPSK) and mapped to a PBICH resource, wherein the PBICH resource is identified by an index pair ($n_{PBICH}^{group}, n_{PBICH}^{seq}$), where $n_{PBICH}^{group}$ is a PBICH group number and $n_{PBICH}^{seq}$ is an orthogonal sequence index within a PBICH group, wherein $n_{PBICH}^{seq}$ corresponds to a PBICH number within the PBICH group and the $n_{PBICH}^{seq}$ is provided by higher layers.

Example 72 includes the apparatus of example 70, wherein the one or more processors are further configured to: encode information in the PBICH, wherein the PBICH includes an orthogonal cover code (OCC) sequence for a Demodulation Reference Signal (DMRS) that correspond to DMRS used for information symbols in the PBICH; wherein, a PBICH channel is transmitted on a group of resource blocks (RBG) and a size of the RBG is either fixed or signaled through system information.

Example 73 includes the apparatus of example 67, wherein the one or more processors are further configured to: encode the resource allocation information for the second RF bandwidth comprising: an X-bit BWA indicator field (BWA-IF) configured in a set of physical bandwidth indicator channels (PBICH) using higher layer signaling, wherein each PBICH is identified by a cyclic shift (CS) index value; and encode the resource allocation information for the second RF bandwidth comprising: an X-bit BWA indicator field (BWA-IF) in a downlink control information (DCI) format that is mapped on a cell-specific search space (CSS) or a UE group specific search space, wherein the X-bit BWA-IF includes: a UE index value used to associate the X-Bit BWA-IF with a selected UE; and a physical downlink control channel (PDCCH) aggregation level.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for bandwidth part (BWP) indication, the apparatus comprising:
one or more processors configured to:
decode, at the UE, downlink control information (DCI), received from a base station, with a DCI format;
identify, at the UE, a BWP indicator field value from the DCI, wherein the BWP indicator field comprises a bitmap identifying a contiguous set of physical resource blocks (PRBs) of a selected subband among a plurality of subbands within a system bandwidth; and
determine, at the UE, a BWP from the BWP indicator field value, the BWP corresponding to the contiguous set of PRBs of the selected subband; and
a memory interface configured to store in a memory the BWP indicator field value.

2. The apparatus of the UE of claim 1, further comprising a transceiver configured to:
receive, at the UE, the downlink control information (DCI) from the base station.

3. The apparatus of the UE of claim 1, wherein the one or more processors are further configured to:
decode, at the UE, the downlink control information (DCI) format that is mapped on a UE-specific search space (USS).

4. The apparatus of the UE of claim 1, wherein the one or more processors are further configured to:
decode, at the UE, the downlink control information (DCI) format that is mapped on a cell-specific search space (CSS).

5. The apparatus of the UE of claim 1, wherein the one or more processors are further configured to determine, at the UE, the BWP from the BWP indicator field value, wherein the BWP is configured using higher layer signaling.

6. The apparatus of the UE of claim 5, wherein the higher layer signaling is radio resource control (RRC) signaling.

7. The apparatus of the UE of claim 1, wherein the UE includes an antenna, a touch sensitive display screen, a speaker, a microphone, a graphics processor, an application processor, an internal memory, a non-volatile memory port, or combinations thereof.

8. An apparatus of a base station operable for bandwidth part (BWP) indication, the apparatus comprising:
one or more processors configured to:
determine, at the base station, a BWP indicator field value, wherein the BWP indicator field comprises a bitmap identifying a contiguous set of physical resource blocks (PRBs) of a selected subband among a plurality of subbands within a system bandwidth;
encode, at the base station for transmission to a user equipment (UE), downlink control information (DCI) with a DCI format, wherein the DCI includes the BWP indicator field value; and
a memory interface configured to send to a memory the BWP indicator field value.

9. The apparatus of the base station of claim 8, further comprising a transceiver configured to:
transmit, at the base station, the downlink control information (DCI) to the UE.

10. The apparatus of the base station of claim 8, wherein the one or more processors are further configured to:
encode, at the base station, the downlink control information (DCI) format that is mapped on a UE-specific search space (USS).

11. The apparatus of the base station of claim 8, wherein the one or more processors are further configured to:
encode, at the base station, the downlink control information (DCI) format that is mapped on a cell-specific search space (CSS).

12. The apparatus of the base station of claim 8, wherein the one or more processors are further configured to encode, at the base station, the BWP from the BWP indicator field value, wherein the BWP is configured using higher layer signaling.

13. The apparatus of the base station of claim 12, wherein the higher layer signaling is radio resource control (RRC) signaling.

14. The apparatus of the base station of claim 8, wherein the base station includes one or more of application circuitry, baseband circuitry, Radio Frequency (RF) circuitry, front-end module (FEM) circuitry, one or more antennas, or power management circuitry (PMC).

15. At least one non-transitory machine readable storage medium having instructions embodied thereon for a user equipment (UE) configured for bandwidth part (BWP) indication, the instructions when executed by one or more processors at the UE perform the following:
decoding, at the UE, downlink control information (DCI), received from a base station, with a DCI format;
identifying, at the UE, a BWP indicator field value from the DCI, wherein the BWP indicator field comprises a bitmap identifying a contiguous set of physical resource blocks (PRBs) of a selected subband among a plurality of subbands within a system bandwidth; and
determining, at the UE, a BWP from the BWP indicator field value, the BWP corresponding to the contiguous set of PRBs of the selected subband.

16. The at least one non-transitory machine readable storage medium in claim 15 further comprising instructions, that when executed by one or more processors at the UE, perform the following:
receiving, at the UE, the downlink control information (DCI) from the base station.

17. The at least one non-transitory machine readable storage medium in claim 15 further comprising instructions, that when executed by one or more processors at the UE, perform the following:
decoding, at the UE, the downlink control information (DCI) format that is mapped on a UE-specific search space (USS).

18. The at least one non-transitory machine readable storage medium in claim 15 further comprising instructions, that when executed by one or more processors at the UE, perform the following:
decoding, at the UE, the downlink control information (DCI) format that is mapped on a cell-specific search space (CSS).

19. The at least one non-transitory machine readable storage medium in claim 15 further comprising instructions, that when executed by one or more processors at the UE, perform the following:
determining, at the UE, the BWP from the BWP indicator field value, wherein the BWP is configured using higher layer signaling.

20. The at least one non-transitory machine readable storage medium in claim 19, wherein the higher layer signaling is radio resource control (RRC) signaling.

* * * * *